(12) United States Patent
Sen et al.

(10) Patent No.: US 11,395,219 B2
(45) Date of Patent: Jul. 19, 2022

(54) METHOD AND APPARATUS FOR PERFORMING PLMN SELECTION IN DUAL REGISTRATION MODE

(71) Applicant: Samsung Electronics Co., Ltd., Suwon-si (KR)

(72) Inventors: Arijit Sen, Bangalore (IN); Lalith Kumar, Bangalore (IN); Pratibha Kattemane Satyaganapati, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/868,827

(22) Filed: May 7, 2020

(65) Prior Publication Data
US 2020/0367153 A1    Nov. 19, 2020

(30) Foreign Application Priority Data

May 7, 2019   (IN) .............................. 201941018210
Apr. 30, 2020 (IN) .............................. 201941018210

(51) Int. Cl.
| H04W 48/18 | (2009.01) |
| H04W 60/00 | (2009.01) |
| H04W 84/04 | (2009.01) |

(52) U.S. Cl.
CPC ......... *H04W 48/18* (2013.01); *H04W 60/005* (2013.01); *H04W 84/042* (2013.01)

(58) Field of Classification Search
CPC .. H04W 48/18; H04W 60/005; H04W 84/042
See application file for complete search history.

(56) References Cited

U.S. PATENT DOCUMENTS

2007/0202875 A1* 8/2007 Dorsey ................. H04W 48/18
                                                     455/434
2011/0098039 A1   4/2011 Lim
(Continued)

FOREIGN PATENT DOCUMENTS

| EP | 3 051 883 A1 | 8/2016 |
| WO | 2014/128641 A1 | 8/2014 |

OTHER PUBLICATIONS

3GPP TS 23.501 V15.0.0 (Dec. 2017), 3rd Generation Partnership Project, Technical Specification Group Services and System Aspects, System Architecture for the 5G System, Stage 2 (Release 15), see in particular section 5.17.2.

(Continued)

*Primary Examiner* — Marisol Figueroa
(74) *Attorney, Agent, or Firm* — Jefferson IP Law, LLP

(57) ABSTRACT

The disclosure relates to a communication method and system for converging a 5th Generation (5G) communication system for supporting higher data rates beyond a 4th Generation (4G) system with a technology for Internet of Things (IoT). A method for performing PLMN selection by user equipment (UE) (100) in dual registration mode is provided. The method includes registering on a registered PLMN (RPLMN) for receiving first wireless technology services and detecting, unavailability of second wireless technology services in at least one of the RPLMN and an equivalent PLMN (EqPLMN), starting, a periodic timer in response to detecting the unavailability of the second wireless technology services in at least one of the RPLMN and the EqPLMN, and performing, the PLMN selection based on a PLMN scan after an expiry of the periodic timer.

7 Claims, 22 Drawing Sheets

(56) References Cited

U.S. PATENT DOCUMENTS

| | | |
|---|---|---|
| 2012/0190361 A1 | 7/2012 | Shaikh et al. |
| 2013/0237223 A1 | 9/2013 | Hietalahti et al. |
| 2014/0235232 A1 | 8/2014 | Lee et al. |
| 2014/0235241 A1 | 8/2014 | Sharan et al. |
| 2016/0219501 A1 | 7/2016 | Chang et al. |
| 2019/0069229 A1* | 2/2019 | Lee .................. H04W 88/06 |

OTHER PUBLICATIONS

3GPP TS 24.501 V15.0.0 (Jun. 2018), 3rd Generation Partnership Project, Technical Specification Group Core Network and Terminals, Non-Access-Stratum (NAS) protocol for 5G System (5GS), Stage 3 (Release 15), see in particular section 4.8.3.

3GPP TS 23.122 V15.0.0 (Jun. 2017), Technical Specification Group Core Network and Terminals, Non-Access-Stratum (NAS) functions related to Mobile Station (MS) in idle mode, (Release 15), see in particular section 4.4.3.3.

3GPP TS 24.301 V15.0.0 (Sep. 2017), 3rd Generation Partnership Project, Technical Specification Group Core Network and Terminals, Non-Access-Stratum (NAS) protocol for Evolved Packet System (EPS), Stage 3 (Release 15), see in particular section 5.5.1.

Jong Ye Lin, "We also have 5G" . . . LGU+ to proceed with dual registration international standard—Economic Daily The Digital Times, Feb. 28, 2018, http://eng.dt.co.kr/contents.html?article_no=20180228113027001417.

3GPP; TSG CT; Non-Access-Stratum (NAS) protocol for 5G System (5GS); Stage 3', 3GPP TS 24.501 V16.0.2, Mar. 29, 2019 section 4.8.3, Mar. 29, 2019.

International Search Report dated Aug. 6, 2020, issued in International Application No. PCT/KR2020/006022.

Indian Office Action dated Nov. 9, 2021, issued in Indian Patent Application No. 201941018210.

Samsung et al., "Clarification related to dual registration mode", 3GPP Draft; C1-192350-DUAL-24301, vol. CT NG1, No. Xi'an (P.R. of China), Apr. 8, 2019-Apr. 12, 2019, XP051705534, Retrieved from the Internet: URL:http://www.3gpp.org/ftp/tsg%5Fct/WG1%5Fmm%2Dcc%2Dsm%5Fex%2DCN1/TSGC1%5F116%5FXian/docs/C1% 2D192350%2Ezip, Apr. 2, 2019.

Intel, "PLMN selection and cell (re-)selection for dual-registration mode", 3GPP TSG-CT WG1 Meeting #109, C1-181605-REV-OF-C1-181156-Dual-RegistrationMode-24501-031-V2, Montreal, Canada, Mar. 1, 2018.

Partial Supplementary European Search Report dated Apr. 8, 2022, issued in European Patent Application No. 20802774.8.

* cited by examiner

METHOD AND APPARATUS FOR PERFORMING PLMN SELECTION IN DUAL REGISTRATION MODE

CROSS-REFERENCE TO RELATED APPLICATION(S)

The application is based on and claims priority under 35 U.S.C. § 119(a) of an Indian provisional patent application number 201941018210, filed on May 7, 2019, in the Indian Intellectual Property Office, and of an Indian patent application number 201941018210, filed on Apr. 30, 2020, in the Indian Intellectual Property Office, the disclosure of each of which is incorporated by reference herein in its entirety.

BACKGROUND

1. Field

The disclosure relates to wireless communication. More particularly, the disclosure relates to a method and a user equipment for performing PLMN selection in dual registration mode.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, 3rd generation partnership project (3GPP) defines single registration mode and dual registration mode of operation for user equipments (UEs) supporting both S1 and N1 modes, in order to interwork with evolved UMTS terrestrial radio access network (E-UTRAN) connected to evolved packet core (EPC). In the dual registration mode, in case a UE is registered in the N1 mode and needs to get registered on the S1 mode, the UE has to use a public land mobile network (PLMN) to which the UE is registered in the N1 mode (i.e., a registered PLMN (RPLMN)) or an equivalent PLMN Similarly, in case the UE is registered in the S1 mode and needs to get registered on the N1 mode, then the UE has to use the PLMN to which the UE is registered in the S1 mode (i.e., RPLMN) or the equivalent PLMN (EPLMN/EqPLMN).

However, there can be a scenario in which the UE registered on the N1 mode may not be able to receive service on the RPLMN/EPLMN on the S1 mode and vice versa and hence the UE is forced to maintain a single registration context, though it's capable of dual registration.

Also, in the methods and systems, there exists no mechanism for the UE to enter back into the dual-registration mode. Further, there are scenarios when a preferred mode of operation of the UE is the dual-registration mode and the UE wants to get back into the dual-registration mode at the earliest, which is not addressed by the methods and systems. In another scenario, there is no procedure defined for handling an expiry of a higher priority PLMN timer when the UE is in the dual-registration-mode. Further, the methods and systems do not define any procedure for handling manual selection of the PLMN by a user when the UE is in the dual-registration mode.

FIG. 1 illustrates an architecture for fourth generation (4G)-fifth generation (5G) core network (CN) level interworking with single registration mode and double registration mode according to the related art.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for performing PLMN selection in dual registration mode.

Another aspect of the disclosure is to determine a PLMN scan to determine one of a registered public land mobile network (RPLMN) and an equivalent PLMN of the RPLMN for providing a second wireless technology services failed.

Another aspect of the disclosure is to activate a periodic timer in response to determining that the PLMN scan is failed and waiting for the periodic timer to expire.

Another aspect of the disclosure is to perform the PLMN selection based on a next PLMN scan performed after expiry of the periodic timer.

Another aspect of the disclosure is to display a list of PLMNs based on the PLMN scan along with an indication of availability of the dual-registration mode for each of the PLMN in a list of PLMNs.

Another aspect of the disclosure is to manage the PLMN selection for a preferred mode of registration based on a PLMN scan when a higher priority PLMN timer associated with a home public land mobile network (HPLMN) of the UE (100) is expires.

Additional aspects will be set forth in part in the description which follows and, in part, will be apparent from the description, or may be learned by practice of the presented embodiments.

In accordance with an aspect of the disclosure, a method for performing PLMN selection by user equipment (UE) in dual registration mode is provided. The method includes registering, by the UE, on a registered PLMN (RPLMN) for receiving first wireless technology services and detecting, by the UE, unavailability of second wireless technology services in at least one of the RPLMN and an equivalent PLMN (EqPLMN), starting, by the UE, a periodic timer in response to detecting the unavailability of the second wireless technology services in at least one of the RPLMN and the EqPLMN, and performing, by the UE (100), the PLMN selection based on a PLMN scan after an expiry of the periodic timer. The UE is dual registration capable.

In accordance with another aspect of the disclosure, a method for performing by the UE, the PLMN selection based on the PLMN scan after the expiry of the periodic timer is provided. The method includes performing, by the UE, the PLMN scan on each expiry of the periodic timer to determine availability of the second wireless technology services on at on at least one of the RPLMN and the EqPLMN PLMN. Further, the method includes performing, by the UE, one of registering to one of the RPLMN and the EqPLMN in the dual registration mode to receive the second wireless technology services, if the second wireless technology services is available in at least one of the RPLMN and the EqPLMN, and performing another PLMN scan to determine whether a lower priority PLMN provides the first wireless technology services and the second wireless technology services, if the second wireless technology services is unavailable in at least one of the RPLMN and the EqPLMN.

In an embodiment of the disclosure, performing the other PLMN scan to determine whether the lower priority PLMN which provides both the first wireless technology services and the second wireless technology services is available includes checking, by the UE (100), availability of the first wireless technology services and the second wireless technology services on the lower priority PLMN. Further, the method includes performing, by the UE (100), one of registering to the lower priority PLMN if the lower priority PLMN provides the first wireless technology services and the second wireless technology services in the dual registration mode, and continuing to receive only the first wireless technology services over the RPLMN in a single registration mode, if the lower priority PLMN does not provide the first wireless technology services and the second wireless technology services.

In an embodiment of the disclosure, the method further includes determining, by the UE (100), a number of PLMN scans performed is greater than a PLMN scan threshold and activating, by the UE (100), a long timer, wherein duration of the long timer is greater than duration of the periodic timer. Further, the method also includes suspending, by the UE (100), the PLMN scan when the long timer is active.

In an embodiment of the disclosure, the first wireless technology services is 4G services and the second wireless technology services is fifth generation (5G) services.

In an embodiment of the disclosure, the first wireless technology services is 5G services and the second wireless technology services is fourth generation (4G) services.

In an embodiment of the disclosure, the periodic timer is one of an incremental timer and a higher priority PLMN timer.

In accordance with another aspect of the disclosure, a method for managing PLMN selection by user equipment (UE) in dual registration mode is provided. The method includes determining, by the UE, that an active application in the UE requires only a first wireless technology service, where the UE is dual registration capable, wherein the UE is camped with a second wireless technology services radio access technology (RAT) of a registered public land mobile network (RPLMN), determining, by the UE, that the RPLMN does not provide a first wireless technology services RAT and determining, by the UE, a user preference of the first wireless technology services RAT based on the active application, determining, by the UE, the PLMN which provides the first wireless technology services RAT in a single registration mode based on a PLMN scan, and managing, by the UE), the PLMN selection by registering with the PLMN which provides the first wireless technology services RAT in the single registration mode based on the PLMN scan.

In accordance with another aspect of the disclosure, a method for managing PLMN selection by user equipment (UE) in dual registration mode is provided. The method includes registering, by the UE, to a RPLMN for receiving 5G services and 4G services in the dual-registration mode and determining, by the UE, a higher priority PLMN timer associated with a HPLMN of the UE (100) has expired, determining, by the UE, that a preferred registration mode is one of the dual registration mode and a single registration mode based on a set of parameters, and managing, by the UE, the PLMN selection for the preferred mode of registration based on a PLMN scan.

In accordance with another aspect of the disclosure, a method for managing PLMN selection by user equipment (UE) in dual registration mode is provided. The method includes receiving, by the UE, a manual PLMN scan request, wherein the UE is registered to a RPLMN for receiving 5G services and 4G services in the dual-registration mode, performing, by the UE, a PLMN scan in response to the manual PLMN scan request received by the UE displaying, by the UE, a list of PLMNs based on the PLMN scan along with an indication of availability of the dual-registration mode for each of the PLMN in the list of PLMNs, receiving, by the UE, an input indicating a selection of a PLMN from the list of PLMNs displayed, and managing, by the UE, the PLMN selection by registering to the PLMN selected based on the input.

In accordance with another aspect of the disclosure, user equipment (UE) for performing PLMN selection in dual registration mode is provided. The UE includes a memory and a processor coupled to the memory. The processor is configured to register on a registered PLMN (RPLMN) for connecting with first wireless technology services, detect unavailability of second wireless technology services in at least one of the RPLMN and an equivalent PLMN (EqPLMN). The UE (100) is dual registration capable, start a periodic timer in response to detecting the unavailability of the second wireless technology services, and perform the PLMN selection based on a PLMN scan after the expiry of the periodic timer.

In accordance with another aspect of the disclosure, user equipment (UE) for performing PLMN selection in dual registration mode is provided. The UE includes a memory and a processor coupled to the memory. The processor is configured to determine that an active application in the UE requires only first wireless technology services, wherein the UE is dual registration capable and wherein the UE (100) is camped with a second wireless technology services RAT of a registered public land mobile network (RPLMN), determine that the RPLMN does not provide a first wireless technology services RAT and determine a user preference of the first wireless technology services RAT based on the active application, determine the PLMN which provides the first wireless technology services RAT in a single registration mode based on a PLMN scan, and manage the PLMN selection by registering with the PLMN which provides the first wireless technology services RAT in the single registration mode based on the PLMN scan.

In accordance with another aspect of the disclosure, user equipment (UE) for performing PLMN selection in dual registration mode is provided. The UE includes a memory and a processor coupled to the memory. The processor is configured to register to a RPLMN for receiving 5G services and 4G services in the dual-registration mode, determine that a higher priority PLMN timer associated with a HPLMN of the UE has expired, determine that a preferred registration mode is one of the dual registration mode and a single registration mode based on a set of parameters, and manage the PLMN selection for the preferred mode of registration based on a PLMN scan.

In accordance with another aspect of the disclosure, user equipment (UE) for performing PLMN selection in dual registration mode is provided. The UE includes a memory and a processor coupled to the memory. The processor is configured to receive a manual PLMN scan request, wherein the UE is registered to a RPLMN for receiving 5G services and 4G services in the dual-registration mode, perform a PLMN scan in response to the manual PLMN scan request received by the UE, display a list of PLMNs based on the PLMN scan along with an indication of availability of the dual-registration mode for each of the PLMN in the list of PLMNs, receive an input indicating a selection of a PLMN from the list of PLMNs displayed, and manage the PLMN selection by registering to the PLMN selected based on the input.

The embodiments of the disclosure herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
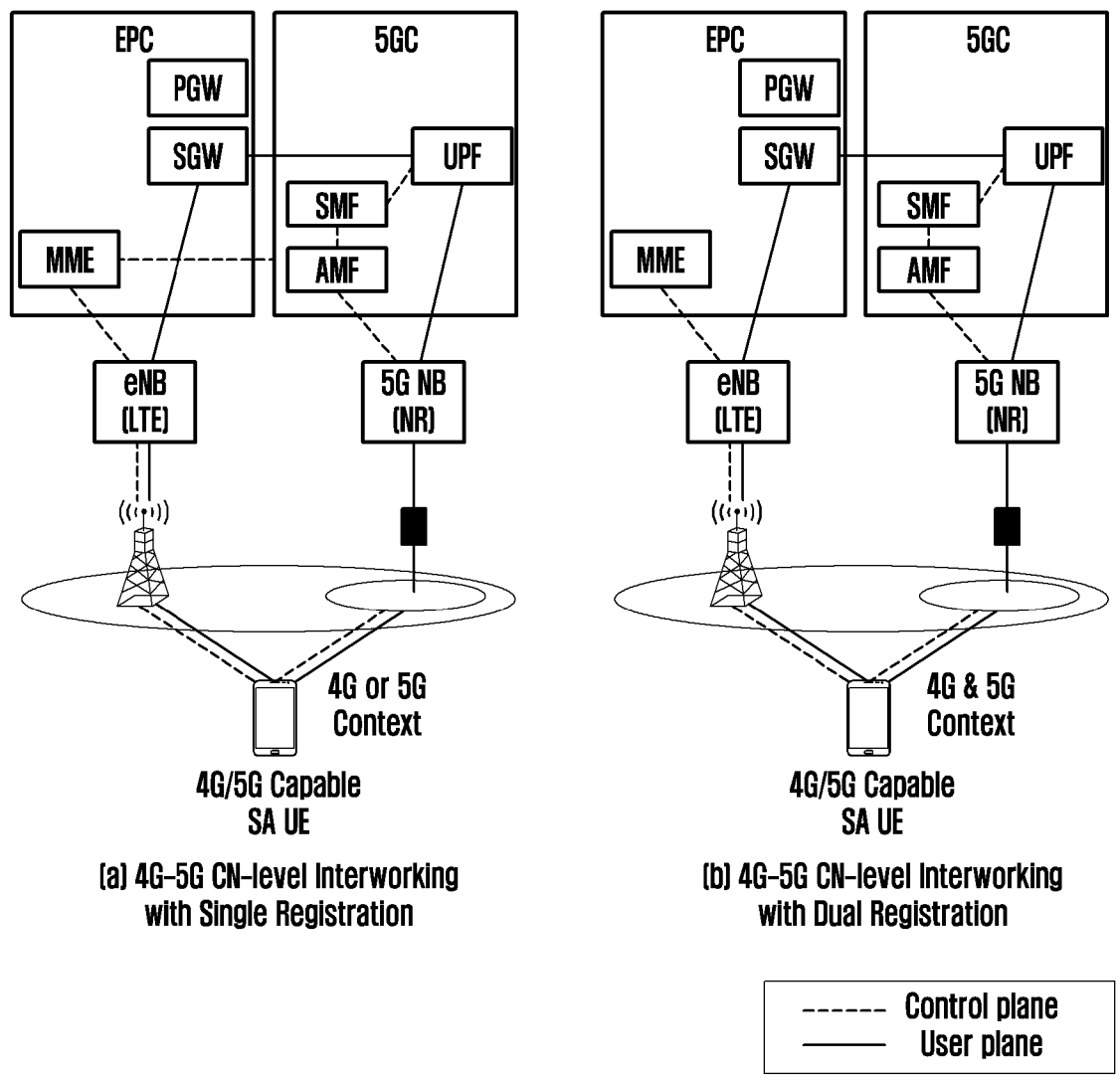
FIG. 1 illustrates an architecture for fourth generation (4G)-fifth generation (5G) core network (CN) level interworking with single registration mode and double registration mode according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for performing public land mobile network (PLMN) selection by user equipment (UE) (100) in dual registration mode. The method includes determining, by the UE (100), a PLMN scan to determine one of: a registered public land mobile network (RPLMN) and an equivalent PLMN of the RPLMN for providing a second wireless technology services failed, where the UE (100) is dual registration capable and where the UE (100) is registered for a first wireless technology services on the RPLMN. The method also includes activating, by the UE (100), a periodic timer in response to determining that the PLMN scan is failed and determining, by the UE (100), an expiry of the activated periodic timer periodically. Further, the method includes performing, by the UE (100), the PLMN selection based on a next PLMN scan.

Referring now to the drawings and more particularly to FIGS. 2 through 5E, where similar reference characters denote corresponding features consistently throughout the figure, these are shown preferred embodiments.

Figure 2:
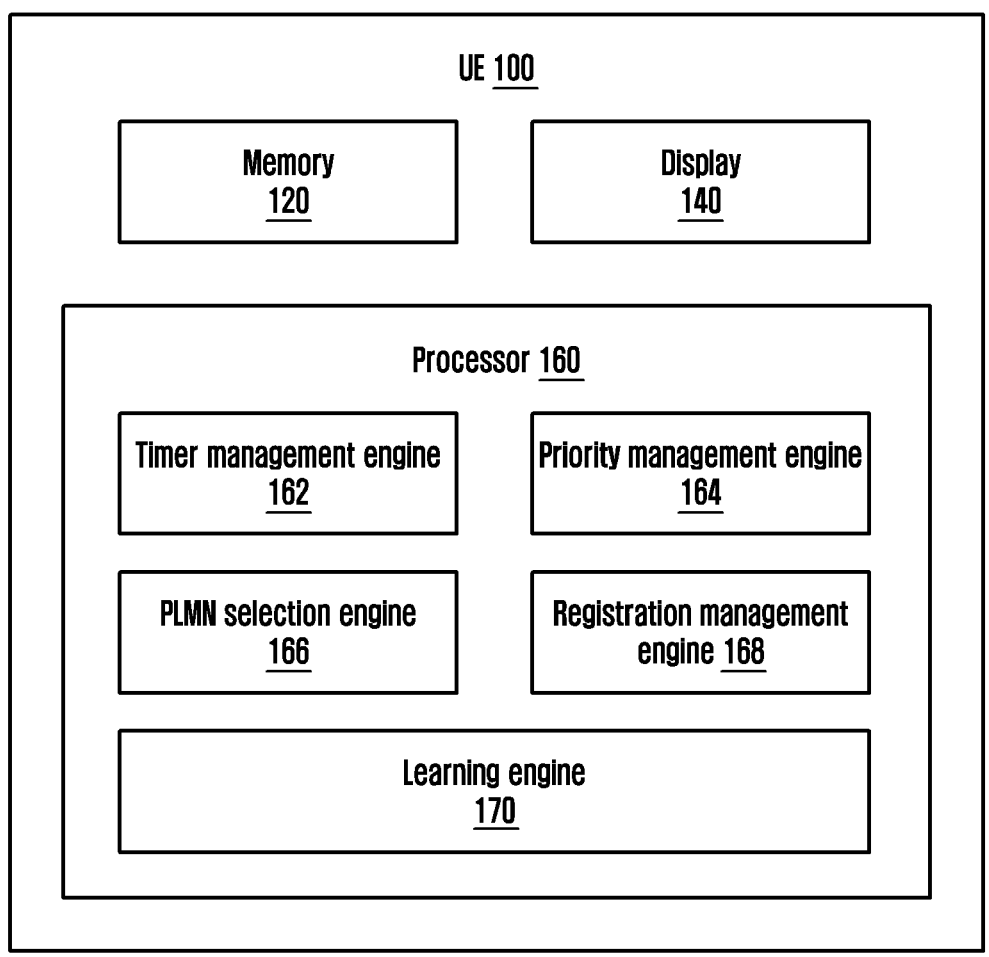
FIG. 2 is a block diagram illustrating user equipment (UE) (100) for performing a PLMN selection in a dual registration mode according to an embodiment of the disclosure.

FIG. 2 is a block diagram illustrating user equipment (UE) (100) for performing PLMN selection in dual registration mode, according to an embodiment of the disclosure.

Referring to FIG. 2, the UE (100) can be but not limited to, for example, a mobile electronic device, a smart electronic device, personal digital assistant (PDA), a tablet or the like. The UE (100) includes a memory (120), a display (140) and a processor (160).

In an embodiment, the memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) is configured to store larger amounts of information than the memory. In certain examples, a non-transitory storage medium may store data that can, over time, change (e.g., in random access memory (RAM) or cache).

In an embodiment, the display (140) is configured to display a list of PLMNs based on the PLMN scan along with an indication of availability of the dual-registration mode for each of the PLMN in the list of PLMNs and receive an input indicating a selection of a PLMN from the list of PLMNs displayed. Further, the display (140) is configured to display a warning message indicating that the dual registration provided by the registered PLMN (RPLMN) is not available in the PLMN selected by the user based on the input received from the user on the display (140) of the UE (100) and suggest at least one PLMN which supports the dual registration mode from the list of PLMNs.

The processor (160) includes a timer management engine (162), a priority management engine (164), PLMN selection engine (166), a registration management engine (168) and a learning engine (170).

In an embodiment, the timer management engine (162) is configured to determine a higher priority PLMN timer associated with a home public land mobile network (HPLMN) of the UE (100) is expired.

In an embodiment, the timer management engine (162) is configured to activate the timer on determining the at least one higher priority PLMN which provides one of the 5G services and the 4G services and wait for the activated timer to expire to determine when to switch to the dual registration mode from the single registration mode based on the PLMN scan.

In an embodiment, the timer management engine (162) is configured to activate a periodic timer in response to determining that the PLMN scan is failed and wait for an expiry of the activated periodic timer periodically after which the PLMN scan is performed. Further, before activating the periodic timer again after expiry, the periodic timer is incremented for example in time intervals of 1, 2, 4, 8 . . . seconds. Further, the timer management engine (162) is configured to activate a long timer based on an indication from the PLMN selection engine (166) when a number of PLMN scans performed is greater than a PLMN scan threshold. A duration of the long timer is greater than a duration of the periodic timer, for example 6 hrs-24 hrs as compared to the 1, 2, 4, 8 . . . seconds of the periodic timer.

In an embodiment, the priority management engine (164) is configured to determine a priority associated with any PLMN which is identified based on the PLMN scan performed by the PLMN selection engine (166).

In an embodiment, the PLMN selection engine (166) is configured to perform the next PLMN scan on each expiry of the periodic timer to determine one of the RPLMN and the equivalent PLMN of the RPLMN for providing the second wireless technology services. Further, the PLMN selection engine (166) is configured to perform another PLMN scan to determine whether a lower priority PLMN which provides both the first wireless technology services and the second wireless technology services is available, in response to determining that the next PLMN scan to determine one of the RPLMN and the equivalent PLMN of the RPLMN for providing the second wireless technology services is not successful. Furthermore, the PLMN selection engine (166) is configured to determine a number of PLMN scans performed are greater than a PLMN scan threshold and indicate the timer management engine (162) to activate a long timer and suspend the PLMN scan when the long timer is active. The first wireless technology services is 4G services and the second wireless technology services is 5G services. The first wireless technology services is 5G services and the second wireless technology services is 4G services. The periodic timer is one of an incremental timer and a higher priority PLMN timer.

In another embodiment, the PLMN selection engine (166) is configured to determine whether at least one higher priority PLMN is available which provides the 5G services and the 4G services in the dual registration mode based on the PLMN scan when the preferred registration mode is the dual registration mode and manage the PLMN selection for the dual registration mode based on the PLMN scan. Further, the PLMN selection engine (166) is also configured to determine at least one higher priority PLMN which provides one of 5G services and 4G services based on the PLMN scan when the preferred registration mode is the single registration mode and manage the PLMN selection in the single registration mode by registering to the at least one higher priority PLMN which provides one of the 5G services and the 4G services.

In another embodiment, the PLMN selection engine (166) is configured to receive a manual PLMN scan request and perform the PLMN scan in response to the manual PLMN scan request received by the UE (100). Further, the PLMN selection engine (166) is configured to identify the list of PLMNs based on the PLMN scan and display the same on the display (140) along with the indication of availability of the dual-registration mode for each of the PLMN in the list of PLMNs and identify the PLMN selected by the user based on the input received on the display (140) selecting the PLMN from the list of PLMNs displayed. Further, the PLMN selection engine (166) is also configured to determine whether the PLMN selected from the list of PLMNs manually by the user supports the dual registration mode. Further, in response to determining that the PLMN selected from the list of PLMNs does not support the dual registration mode, the PLMN selection engine (166) is also configured to provide the warning message on the display (140) indicating that the dual registration provided by the RPLMN is not available in the selected PLMN and also suggest at least one PLMN which supports the dual registration mode from the list of PLMNs.

In another embodiment, the PLMN selection engine (166) is configured to determine an active application in the UE (100) requires only a first wireless technology services and determine that the RPLMN does not provide a first wireless technology services RAT. Further, the PLMN selection engine (166) is configured to determine a user preference of the first wireless technology services RAT based on the active application and determine the PLMN which provides the first wireless technology services RAT in the single registration mode based on the PLMN scan.

In an embodiment, the registration management engine (168) is configured to register to one of: the RPLMN and the equivalent PLMN of the RPLMN in the dual registration mode to receive the second wireless technology services, in response to determining that the next PLMN scan to determine one of: the RPLMN and the equivalent PLMN of the RPLMN for providing the second wireless technology services is successful. In another embodiment, the registration management engine (168) is configured to register to the lower priority PLMN which provides both the first wireless technology services and the second wireless technology services in the dual registration mode, in response to determining the other PLMN scan to determine the lower priority PLMN which provides both the first wireless technology services and the second wireless technology services is successful and continue to be registered to the RPLMN to receive only the first wireless technology services in a single registration mode, in response to determining the other PLMN scan to determine the lower priority PLMN which provides both the first wireless technology services and the second wireless technology services is not successful.

In another embodiment, the registration management engine (168) is configured to determine a preferred registration mode is one of the dual registration mode and a single registration mode based on a set of parameters. The set of parameters includes inputs received from the learning engine (170), user preference, a usage pattern of a user, a quality of service on the PLMN at a particular area, applications in the UE (100), data stall, Radio layer failure (low RSRP, error rate), Temperature, Battery level, NITZ time, GPS location, artificial intelligence, Cell ID, PLMN, TAI etc. The set of parameters are also used to provide the preferred RAT list (in the priority order) and the preferred PLMN list (in the priority order).

Further, the registration management engine (168) is configured to register to a higher priority PLMN of the at least one higher priority PLMN which provides the 5G services and the 4G services in the dual-registration mode, in response to determining that the at least one higher priority PLMN which provides the 5G services and the 4G services in the dual registration mode based on the PLMN scan is available, and continue to operate with the RPLMN which provides the 5G services and the 4G services in the dual-registration mode, in response to determining that the at least one higher priority PLMN which provides the 5G services and the 4G services in the dual registration mode based on the PLMN scan is not available. Further, the registration management engine (168) is configured to register to the at least one higher priority PLMN which provides one of the 5G services and the 4G services, when the preferred registration mode is the single registration mode.

In another embodiment, the registration management engine (168) is configured to register to the PLMN manually selected by the user from the list of PLMNs provided by the PLMN selection engine (166).

In an embodiment, the learning engine (170) is configured to provide an indication to the PLMN selection engine (166) to perform the PLMN scan after a long time break when the number of PLMN scans performed is greater than the PLMN scan threshold. In another embodiment, the learning engine (170) is configured to provide inputs to the registration management engine (168) to determine the preferred registration mode. The learning could include but not limited to, quality of service on a certain PLMN at a particular area, user's usage pattern (if user wants ultra reliable low latency communication (URLLC) kind of service or delay tolerant service at a particular time etc.

Although the FIG. 2 shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope. One or more components can be combined together to perform same or substantially similar function.

Figure 3A:
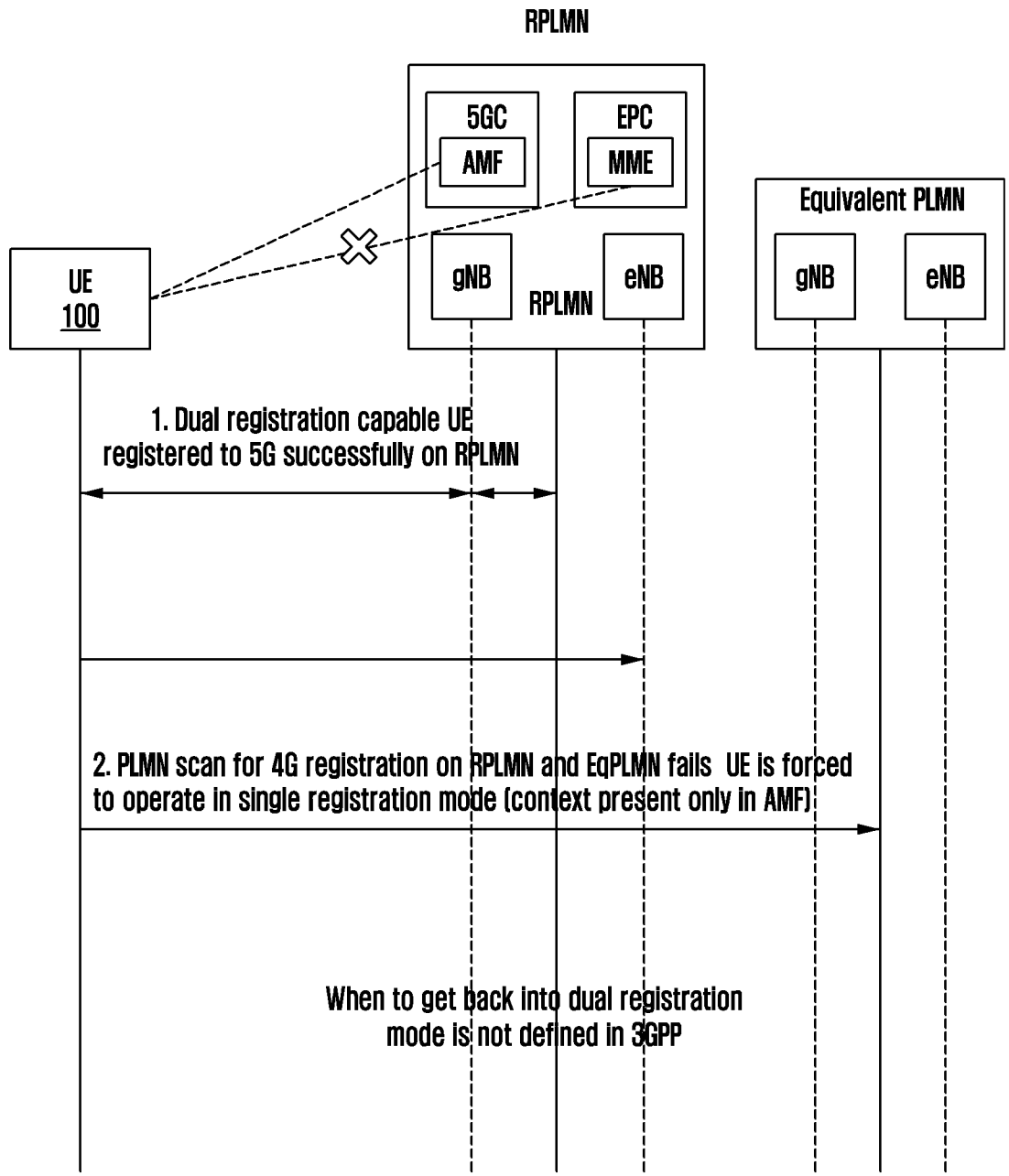
FIG. 3A is a signal diagram illustrating example scenario where a time period for returning to the dual registration mode by the UE (100) is not defined in 3GPP during the PLMN selection according to an embodiment of the disclosure.

FIG. 3A is a signal diagram illustrating example scenario where a time period for returning to the dual registration mode by the UE (100) is not defined in 3GPP during the PLMN selection, according to an embodiment of the disclosure.

Referring to FIG. 3A, at operation 1, consider a scenario when the dual registration capable UE (100) is powered ON and the UE (100) is registered to the fifth generation radio access technology (5G RAT) (N1 mode) on the RPLMN to receive the 5G services (as shown in operation 1). Generally, according to standard specifications, the UE (100) first performs the PLMN scan for the fourth generation radio access technology (4G RAT) (S1 mode) on the RPLMN. Further, the UE (100) performs the PLMN scan to determine the availability of the 4G RAT on the equivalent PLMN of the RPLMN to receive the 4G services. However, at operation 2, the PLMN scan to determine the 4G RAT on the RPLMN and the equivalent PLMN both fails and the UE (100) is forced to maintain a single registration context (only in the access and mobility management function (AMF)), though the UE (100) is capable of dual registration.

Figure 3B:
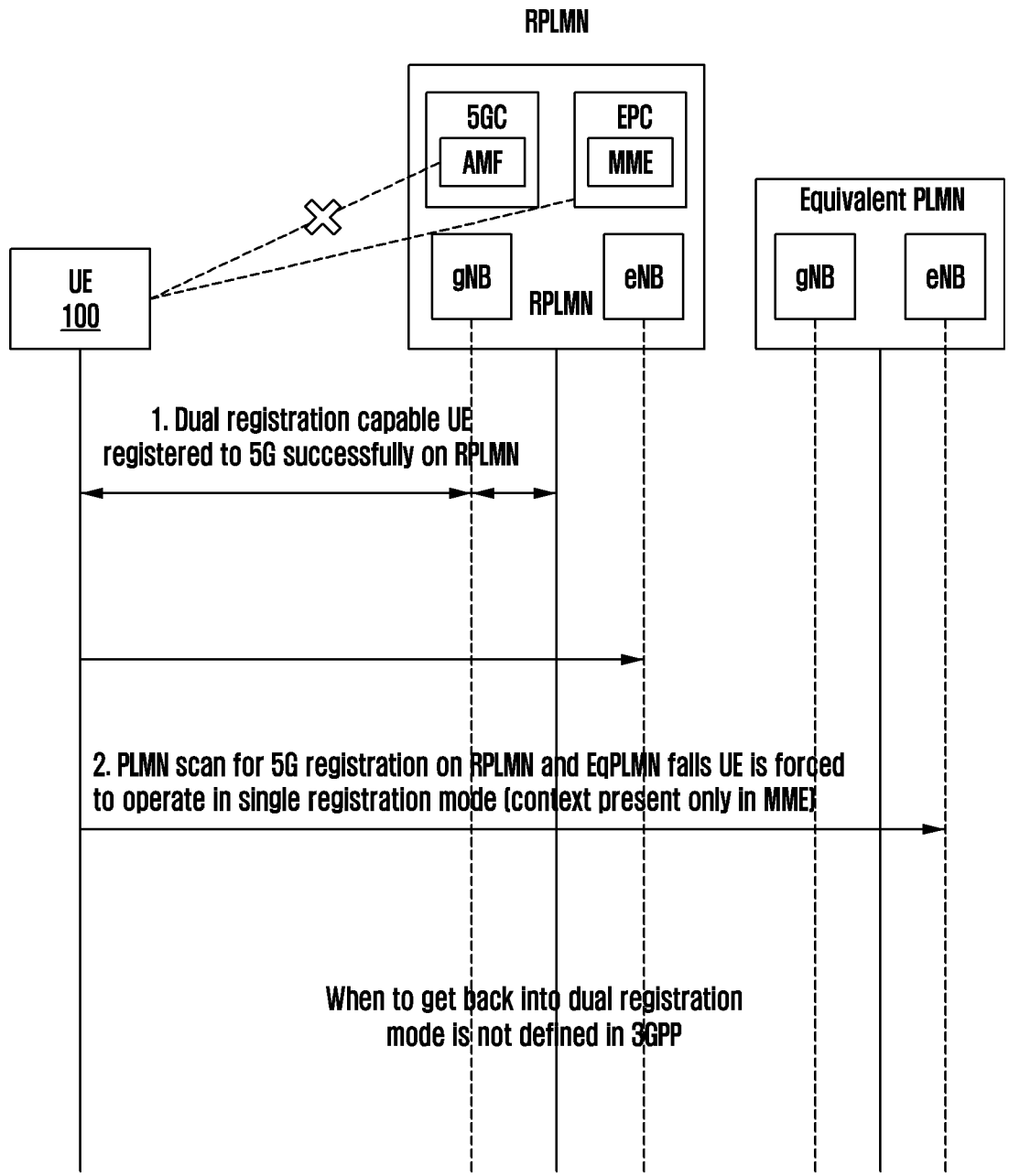
FIG. 3B is a signal diagram illustrating example scenario where a time period for returning to the dual registration mode by the UE (100) is not defined in 3GPP during the PLMN selection according to an embodiment of the disclosure.

FIG. 3B is a signal diagram illustrating example scenario where a time period for returning to the dual registration mode by the UE (100) is not defined in 3GPP during the PLMN selection, according to an embodiment of the disclosure.

Referring to FIG. 3B, in conjunction with the FIG. 3A, the UE (100) which is dual registration capable in another scenario may be registered to the 4G RAT (S1 mode) successfully on the RPLMN (as shown in operation 1). Further, at operation 2, the PLMN scan for the 5G RAT (N1 mode) registration on one of the RPLMN and the EqPLMN of the 4G RAT fails and hence forcing the UE (100) to maintain a single registration context (only in the mobility management entity (MME)), though the UE (100) is capable of operating in the dual registration.

In the methods and systems; and in the 3GPP standard specifications, the procedure for the UE (100) to return to the dual registered mode is not defined. Therefore, due to the lack of procedure, the UE (100) may be forced to continue operating in the single registration mode even though the UE (100) is dual registration capable rendering the capability of the UE (100) in vain and under-utilized.

Figure 3C:
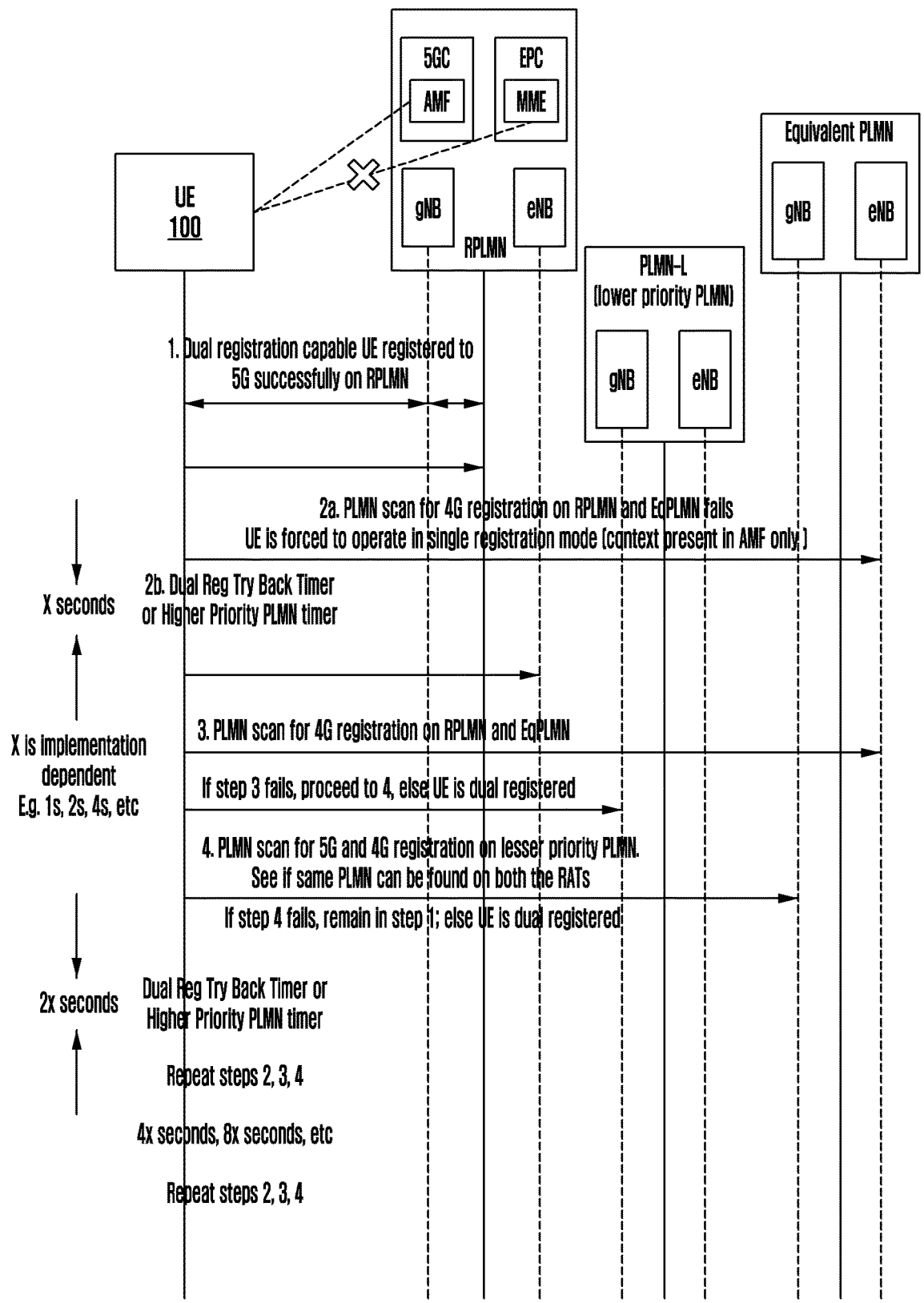
FIG. 3C is a signal diagram illustrating the example scenario where the periodic timer is activated by the UE (100) when the PLMN scan fails to return to the dual registration mode according to an embodiment of the disclosure of the disclosure.

FIG. 3C is a signal diagram illustrating the example scenario where the periodic timer is activated by the UE (100) when the PLMN scan fails to return to the dual registration mode, according to an embodiment of the disclosure.

Referring to FIG. 3C, in conjunction with the FIG. 3A, the operations 1 and 2a in the FIG. 3C may be substantially the same as operations 1 and 2 described in the FIG. 3A, and thus repeated description is omitted.

At operation 2b, the UE (100) activates the periodic timer in response to determining that the PLMN scan is failed for the 4G services. The periodic timer is activated for a period of 'X' seconds. The periodic timer is implementation specific and can be one of: dual reg try back timer or higher priority PLMN timer.

At operation 3, the UE (100) determines the expiry of the activated periodic timer and performs the next PLMN scan to determine one of the RPLMN and the equivalent PLMN of the RPLMN for providing the 4G services. In the operation 3, in case the next PLMN scan is successful, then the UE (100) will latch to the one of the RPLMN and the equivalent PLMN of the RPLMN which is determined based on the next PLMN scan for the 4G services.

In the operation 3, in case the next PLMN scan is unsuccessful, then at operation 4 the UE (100) performs another PLMN scan to determine the availability of the lesser priority PLMN which provides both the 5G and the 4G services. The UE (100) if the same PLMN can be found on both the RATs. In case the operation 4 is successful then the UE (100) is dual registered with the lesser priority PLMN for both the 5G and the 4G services. Further, if the operation 4 fails, then the UE (100) remains in the operation 1 and the periodic timer is activated again after being incremented for a period of '2X' seconds. Further, the operations 2-4 are repeated until a PLMN which provides both the 5G services and the 4G services is found.

Furthermore, the UE (100) determines that the number of PLMN scans performed is greater than the PLMN scan threshold. In response to determining that the number of PLMN scans performed is greater than the PLMN scan threshold the UE (100) activates the long timer (6 hrs-24 hrs) which has the duration greater than the duration of the periodic timer and suspends the PLMN scan when the long timer is active. Therefore, the UE (100) will not scan until the UE (100) receives the indication from the learning engine (170) and/or motion/grip sensor(s) and/or user interface or long-timer-expiry.

Furthermore, the UE (100) can decide the priority RAT and register on the priority RAT with the RPLMN (say 5G, N1 mode). The UE (100) may decide on the priority RAT based on the inputs received from the learning engine (170). The inputs will be regarding which RAT provides better service in a particular area etc.

Figure 3D:
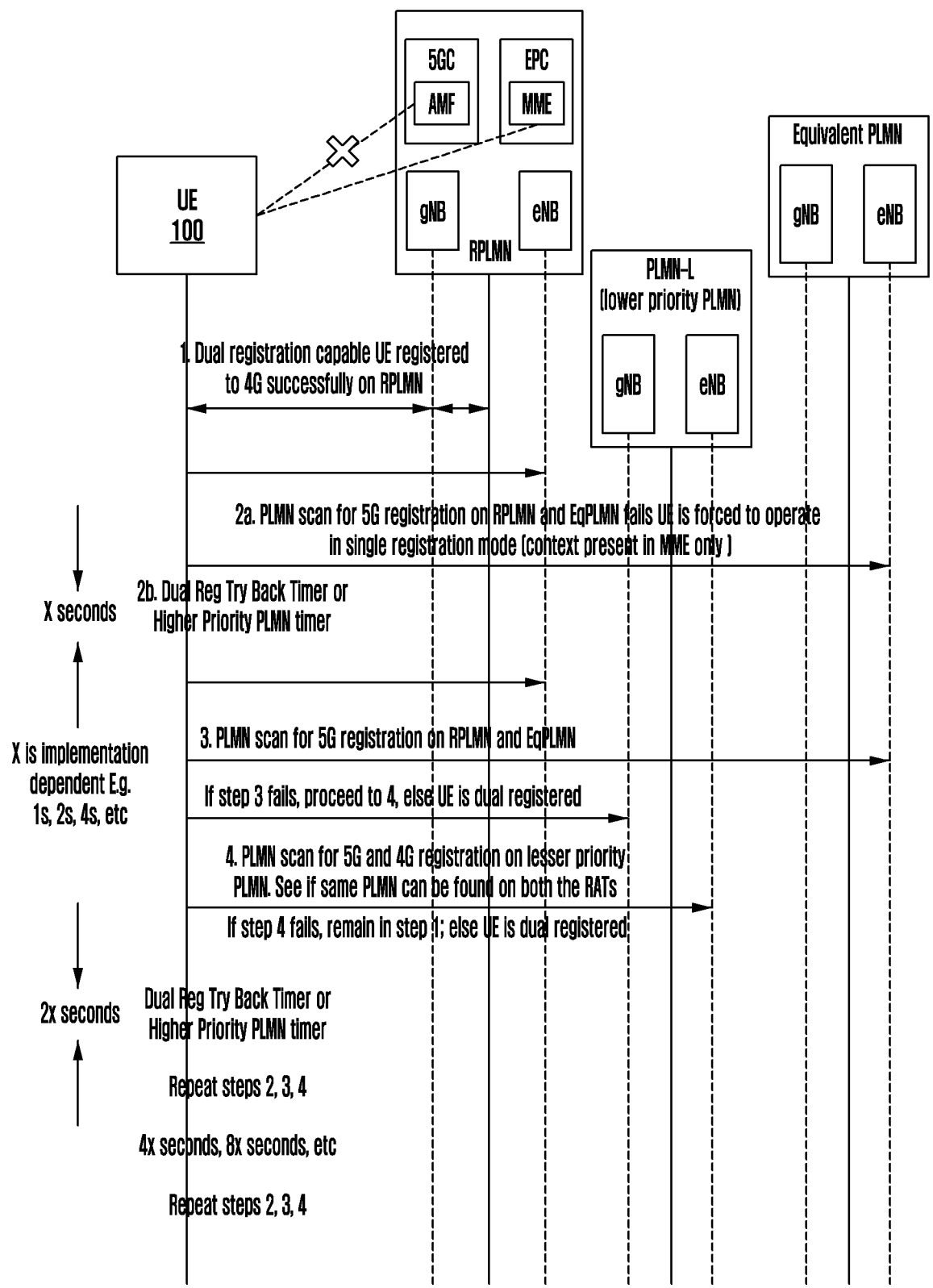
FIG. 3D is another signal diagram illustrating the example scenario where the periodic timer is activated by the UE (100) when the PLMN scan fails to return to the dual registration mode according to an embodiment of the disclosure.

FIG. 3D is another signal diagram illustrating the example scenario where the periodic timer is activated by the UE (100) when the PLMN scan fails to return to the dual registration mode, according to an embodiment of the disclosure.

Referring to FIG. 3D, in conjunction with the FIG. 3B, the operations 1 and 2a in the FIG. 3D may be substantially the same as operations 1 and 2 described in the FIG. 3B, and thus repeated description is omitted.

At operation 2b, the UE (100) activates the periodic timer in response to determining that the PLMN scan is failed for the 5G services. The periodic timer is activated for a period of 'X' seconds. The periodic timer is implementation specific and can be one of: dual reg try back timer or higher priority PLMN timer.

At operation 3, the UE (100) determines the expiry of the activated periodic timer and performs the next PLMN scan to determine one of the RPLMN and the equivalent PLMN of the RPLMN for providing the 5G services. In the operation 3, in case the next PLMN scan is successful, then the UE (100) will latch to the one of the RPLMN and the equivalent PLMN of the RPLMN which is determined based on the next PLMN scan for the 5G services.

In the operation 3, in case the next PLMN scan is unsuccessful, then at operation 4 the UE (100) performs another PLMN scan to determine the availability of the lesser priority PLMN which provides both the 5G and the 4G services. The UE (100) determines if the same PLMN can be found on both the RATs. In case the operation 4 is successful then the UE (100) is dual registered with the lesser priority PLMN for both the 5G and the 4G services. Further, if the operation 4 fails, then the UE (100) remains in the operation 1 and the periodic timer is activated again after being incremented for a period of '2X' seconds. Further, the operations 2-4 are repeated until the PLMN which provides both the 5G services and the 4G services is found.

Figure 3E:
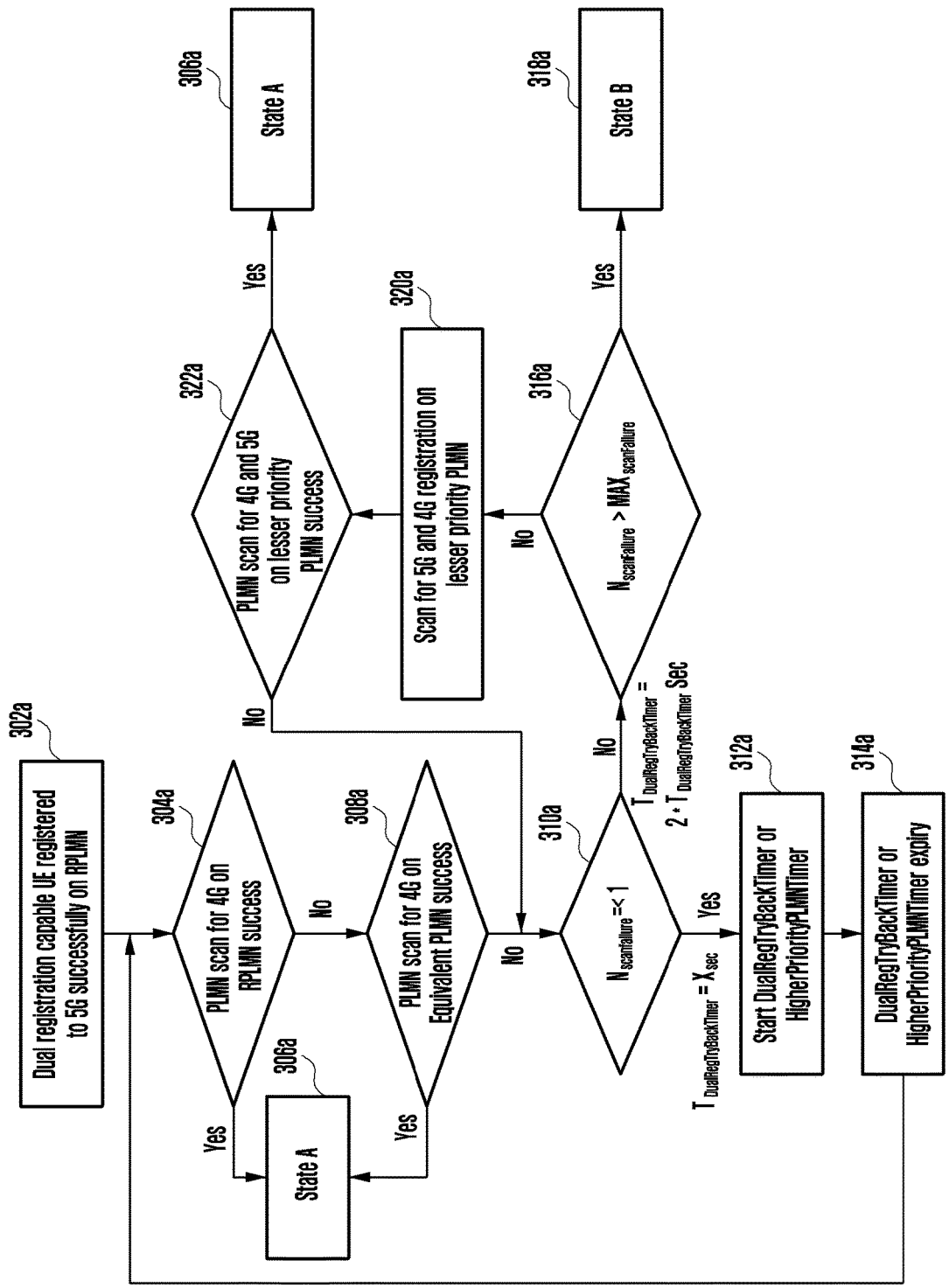
FIG. 3E is a flow chart illustrating the method for performing PLMN selection by the UE (100) in the dual registration mode when the UE (100) is registered to a 5G RAT according to an embodiment of the disclosure.

FIG. 3E is a flow chart illustrating the method for performing PLMN selection by the UE (100) in the dual registration mode when the UE (100) is registered to a 5G RAT, according to an embodiment of the disclosure.

Referring to FIG. 3E, at operation 302a, the dual registration capable UE (100) is registered to the 5G RAT successfully on the RPLMN.

At operation 304a, the UE (100) performs the PLMN scan for the 4G RAT on the RPLMN and determines whether the PLMN scan is successful. At operation 306a, in response to determining that the PLMN scan for the 4G RAT on the RPLMN is successful, the UE (100) initiates a state A.

Further, at operation 308a, in response to determining that the PLMN scan for the 4G RAT on the RPLMN is not successful, the UE (100) performs the PLMN scan to determine the availability of the 4G RAT on the Equivalent PLMN of the RPLMN and determines whether the PLMN scan is successful.

At operation 308a, in response to determining that the PLMN scan for the 4G RAT on the Equivalent PLMN of the RPLMN is successful, the UE (100) loops to operation 306a and initiates the state A.

At operation 310a, in response to determining that the PLMN scan for the 4G RAT on the equivalent PLMN of the RPLMN is unsuccessful, the UE (100) determines whether Nscanfailure which is the number of PLMN scans is less than or equal to 1. At operation 312a, the UE (100) starts the DualRegTryBackTimer or the HigherPriorityPLMNTimer with duration TDualRegTryBackTimer=X sec and waits till at operation 314a, the expiry of the DualRegTryBackTimer or HigherPriorityPLMNTimer. Further, in response to determining that the DualRegTryBackTimer or HigherPriorityPLMNTimer is expired, the UE (100) loops to the operation 304a and performs the PLMN scan for the 4G RAT on the RPLMN.

At operation 310a, in response to determining that the Nscanfailure is not less than or equal to 1, the UE (100) increments the DualRegTryBackTimer or HigherPriorityPLMNTimer by incrementing the duration as T DualRegTryBackTimer=2*T DualRegTryBackTimer sec and at operation 316a, the UE (100) determines whether NscanFailure is greater than a MAXscanFailure threshold.

At operation 316a, in response to determining that the NscanFailure is greater than a MAXscanFailure threshold, the UE (100) at operation 318a initiates a state B. At operation 316a, in response to determining that the Nscan-Failure is not greater than a MAXscanFailure threshold, the UE (100) at operation 320a initiates the PLMN scan to determine the 5G RAT and the 4G RAT registration on the lesser priority PLMN.

At operation 322a, the UE (100) determines whether the PLMN scan to determine the 5G RAT and the 4G RAT registration on the lesser priority PLMN is successful. Further, at operation 322a, in response to determining that the PLMN scan to determine the 5G RAT and the 4G RAT registration on the lesser priority PLMN is successful, the UE (100) initiates the state A (at operation 306a). At operation 322a, in response to determining that the PLMN scan to determine the 5G RAT and the 4G RAT registration on the lesser priority PLMN is not successful, the UE (100) loops to operation 310a.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope.

Figure 3F:
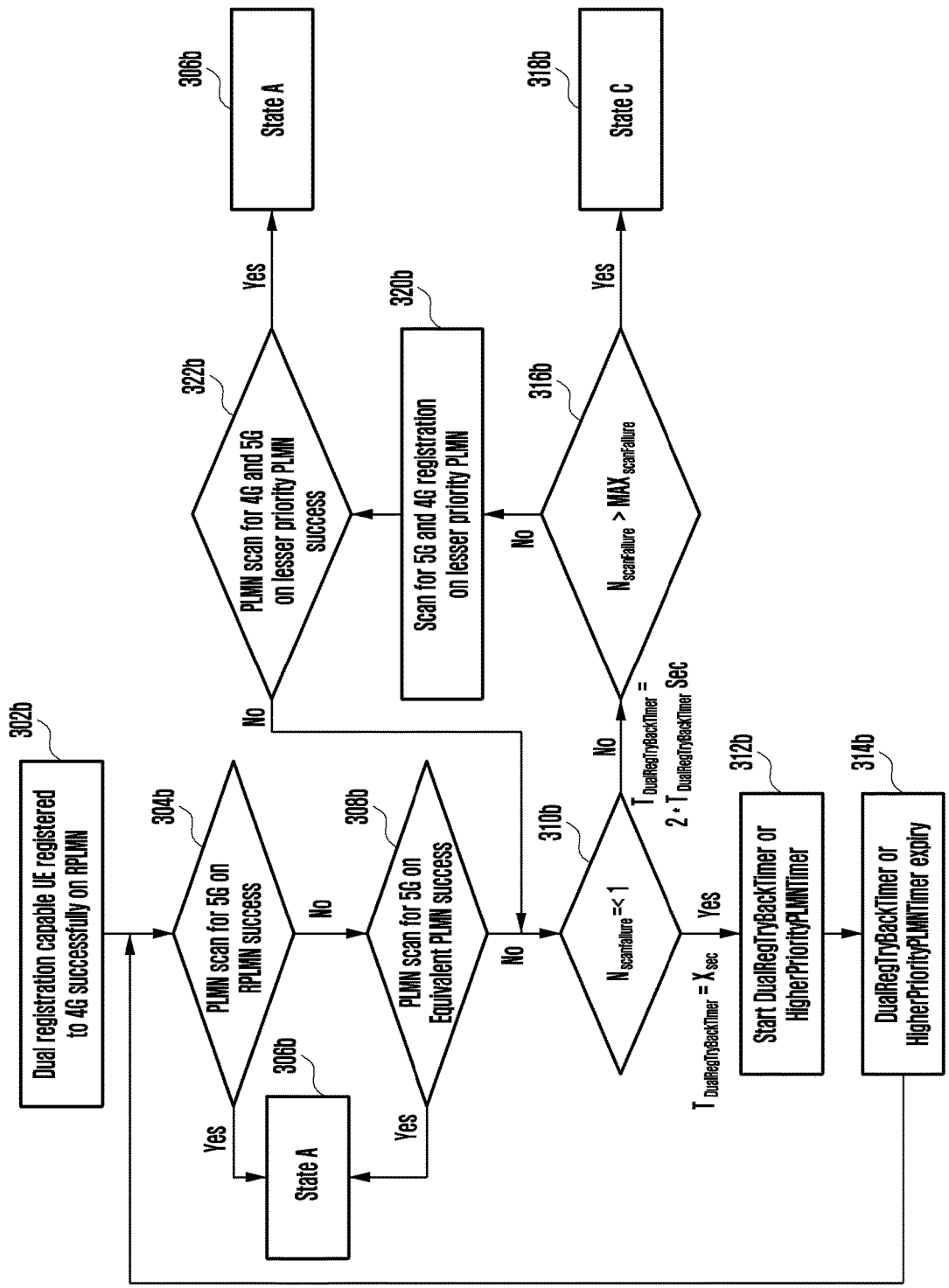
FIG. 3F is a flow chart illustrating the method for performing PLMN selection by the UE (100) in the dual registration mode when the UE (100) is registered to a 4G RAT according to an embodiment of the disclosure.

FIG. 3F is a flow chart illustrating the method for performing PLMN selection by the UE (100) in the dual registration mode when the UE (100) is registered to a 4G RAT, according to an embodiment of the disclosure.

Referring to FIG. 3F, at operation 302b, the dual registration capable UE (100) is registered to the 4G RAT successfully on the RPLMN.

At operation 304b, the UE (100) performs the PLMN scan for the 5G RAT on the RPLMN and determines whether the PLMN scan is successful. At operation 306b, in response to determining that the PLMN scan for the 5G RAT on the RPLMN is successful, the UE (100) initiates a state A.

Further, at operation 308b, in response to determining that the PLMN scan for the 5G RAT on the RPLMN is not successful, the UE (100) performs the PLMN scan to determine the availability of the 5G RAT on the equivalent PLMN of the RPLMN and determines whether the PLMN scan is successful.

At operation 308b, in response to determining that the PLMN scan for the 5G RAT on the Equivalent PLMN of the RPLMN is successful, the UE (100) loops to operation 306b and initiates the state A.

At operation 310b, in response to determining that the PLMN scan for the 5G RAT on the Equivalent PLMN of the RPLMN is unsuccessful, the UE (100) determines whether Nscanfailure which is the number of PLMN scans is less than or equal to 1. At operation 312b, the UE (100) starts the DualRegTryBackTimer or the HigherPriorityPLMNTimer with duration TDualRegTryBackTimer=X sec and waits till at operation 314b, the expiry of the DualRegTryBackTimer or HigherPriorityPLMNTimer. Further, in response to determining that the DualRegTryBackTimer or HigherPriorityPLMNTimer is expired, the UE (100) loops to the operation 304b and performs the PLMN scan for the 5G RAT on the RPLMN.

At operation 310b, in response to determining that the Nscanfailure is not less than or equal to 1, the UE (100) increments the DualRegTryBackTimer or HigherPriorityPLMNTimer by incrementing the duration as T DualRegTryBackTimer=2*T DualRegTryBackTimer sec and at operation 316b, the UE (100) determines whether NscanFailure is greater than a MAXscanFailure threshold.

At operation 316b, in response to determining that the NscanFailure is greater than a MAXscanFailure threshold, the UE (100) at operation 318b initiates a state C. At operation 316b, in response to determining that the Nscan-Failure is not greater than a MAXscanFailure threshold, the UE (100) at operation 320b initiates the PLMN scan to determine the 4G RAT and the 5G RAT registration on the lesser priority PLMN.

At operation 322b, the UE (100) determines whether the PLMN scan to determine the 4G RAT and the 5G RAT registration on the lesser priority PLMN is successful. Further, at operation 322b, in response to determining that the PLMN scan to determine the 4G RAT and the 5G RAT registration on the lesser priority PLMN is successful, the UE (100) initiates the state A (at operation 306b). At operation 322b, in response to determining that the PLMN scan to determine the 4G RAT and the 5G RAT registration on the lesser priority PLMN is not successful, the UE (100) loops to operation 310b.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope.

Figure 3G:
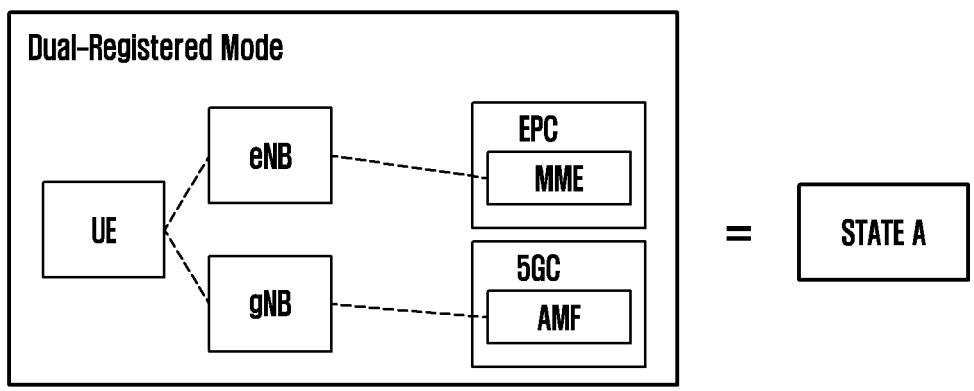
FIG. 3G illustrates various states of the dual registration capable UE (100) according to an embodiment of the disclosure.
Figure 3G:
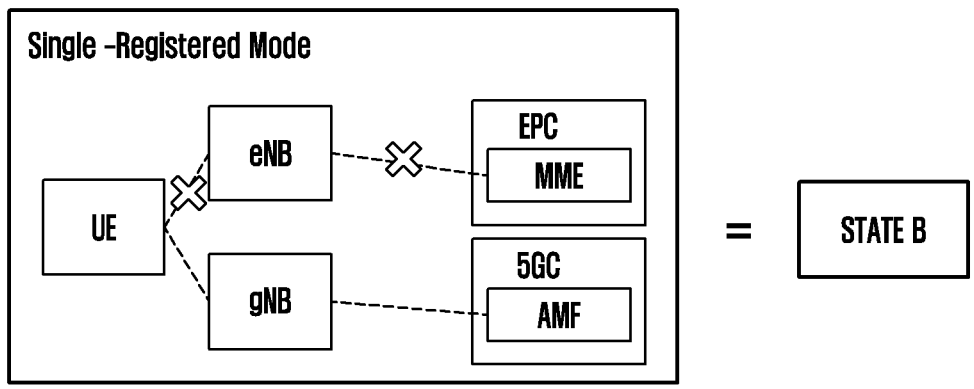
Figure 3G:
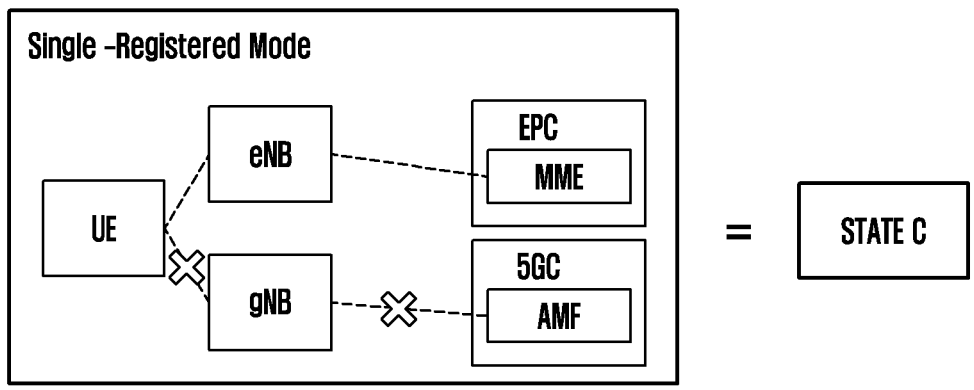

FIG. 3G illustrates various states of the dual registration capable UE (100), according to an embodiment of the disclosure.

Referring to FIG. 3G, state A includes the UE (100) in dual registration mode where the UE (100) is registered for both the 4G service and the 5G service with the same PLMN. The PLMN may be one of: the RPLMN, equivalent PLMN of the RPLMN, lesser priority PLMN and any PLMN which provides both the 4G service and the 5G service.

State B includes the dual registration capable UE (100) which is registered only for the 5G service with the PLMN.

State C includes the dual registration capable UE (100) which is registered only for the 4G service with the PLMN.

Figure 4A:
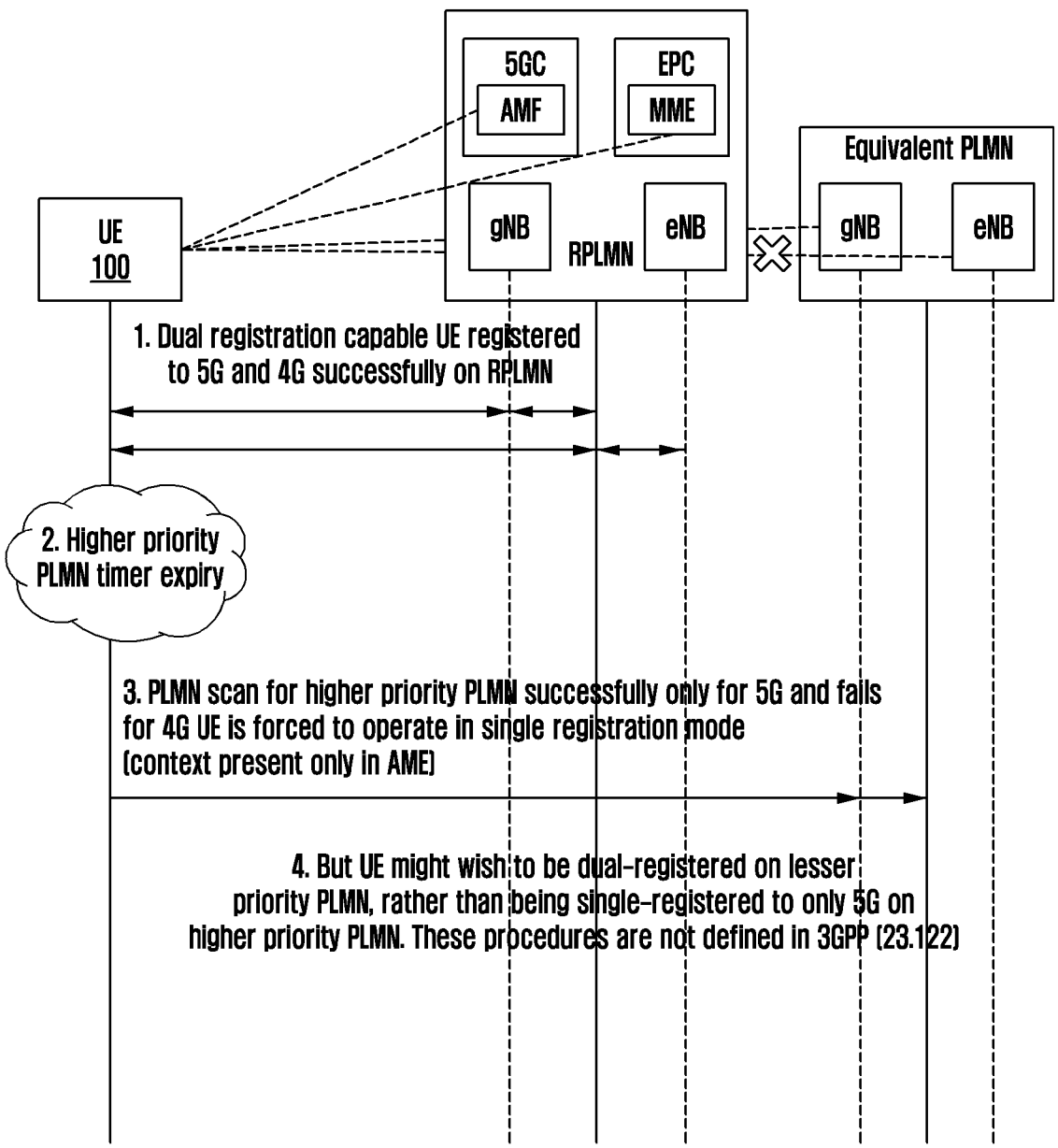
FIG. 4A is a signal diagram illustrating a scenario of the expiry of a higher priority PLMN timer when the UE (100) is dual registered according to an embodiment of the disclosure.

FIG. 4A is a signal diagram illustrating a scenario of the expiry of a higher priority PLMN timer when the UE (100) is dual registered, according to an embodiment of the disclosure.

Referring to FIG. 4A, consider that the dual registration capable UE (100) is registered to both the 5G RAT and the 4G RAT successfully on the RPLMN (operation 1). At operation 2, the UE (100) determines that the higher priority PLMN timer associated with the HPLMN of the UE (100) is expired. Further, at operation 3, in response to determining that the higher priority PLMN timer associated with the HPLMN of the UE (100) is expired, the UE (100) performs the PLMN scan to determine the availability of the higher priority PLMN for both the 4G service and the 5G service. At operation 3, the UE (100) determines that the PLMN scan to determine the higher priority PLMN is successful only for the 5G RAT and fails for the 4G RAT (context in access and mobility management function (AMF) only).

Figure 4B:
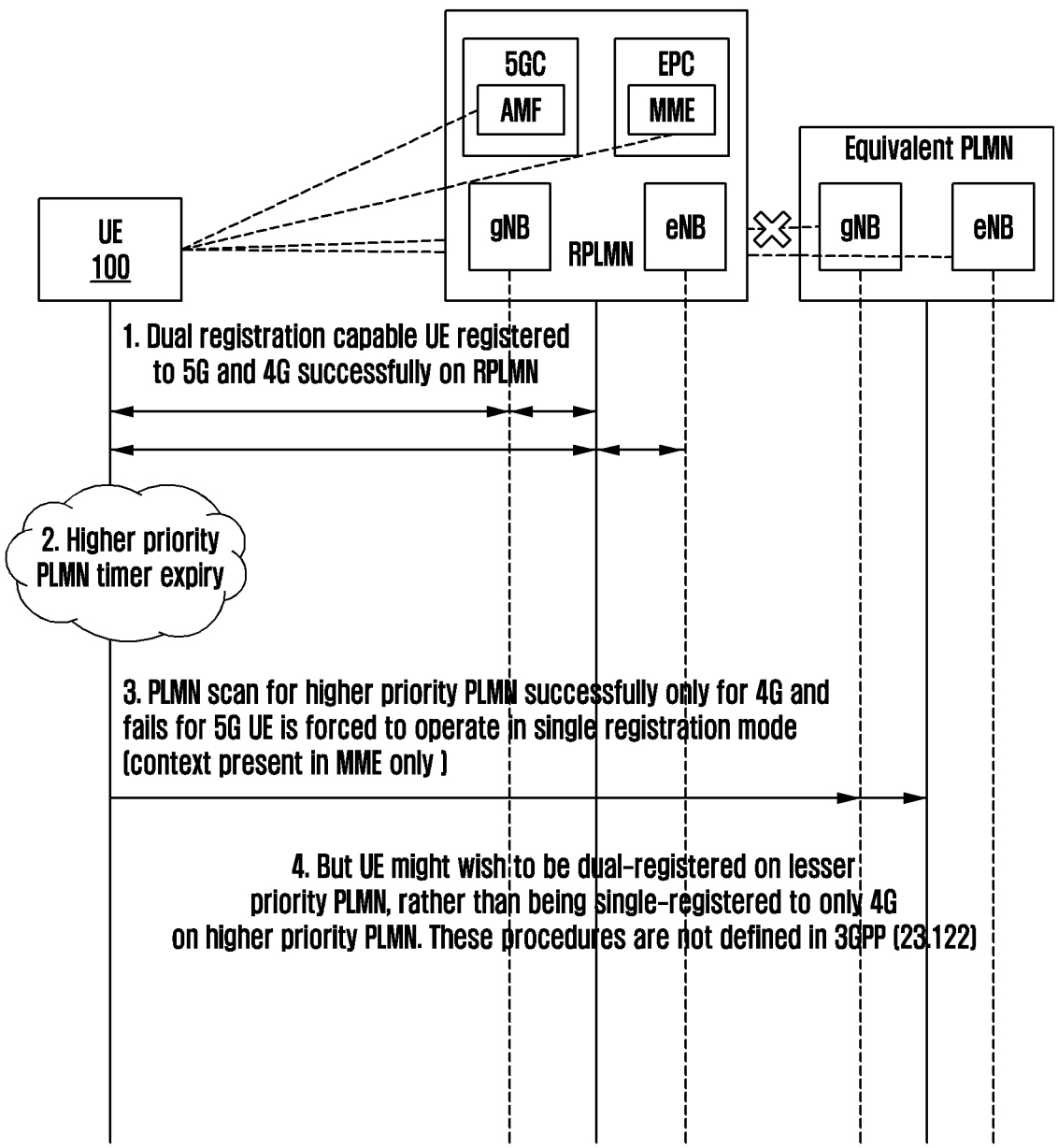
FIG. 4B is a signal diagram illustrating a scenario of the expiry of a higher priority PLMN timer when the UE (100) is dual registered according to an embodiment of the disclosure.

FIG. 4B is a signal diagram illustrating a scenario of the expiry of a higher priority PLMN timer when the UE (100) is dual registered, according to an embodiment of the disclosure.

Similarly referring to the FIG. 4B, operation 1 and operation 2 of the FIG. 4B may be substantially the same as the operation 1 and operation 2 of the FIG. 4A, and, thus repeated description is omitted. Further, at operation 3, in response to determining that the higher priority PLMN timer associated with the HPLMN of the UE (100) is expired, the UE (100) performs the PLMN scan to determine the availability of the higher priority PLMN for both the 4G service and the 5G service. At operation 3, the UE (100) determines that the PLMN scan to determine the higher priority PLMN is successful only for the 4G RAT and fails for the 5G RAT (context in mobility management entity (MME) only).

Therefore, in both the above mentioned scenarios the UE (100) is forced to maintain the single registration context (only in the AMF or MME), though the UE (100) is capable of the dual registration since there is no procedure defined in the 3GPP 23.122 for handling the higher priority PLMN timer expiry when the UE (100) is in the dual registration mode.

Figure 4C:
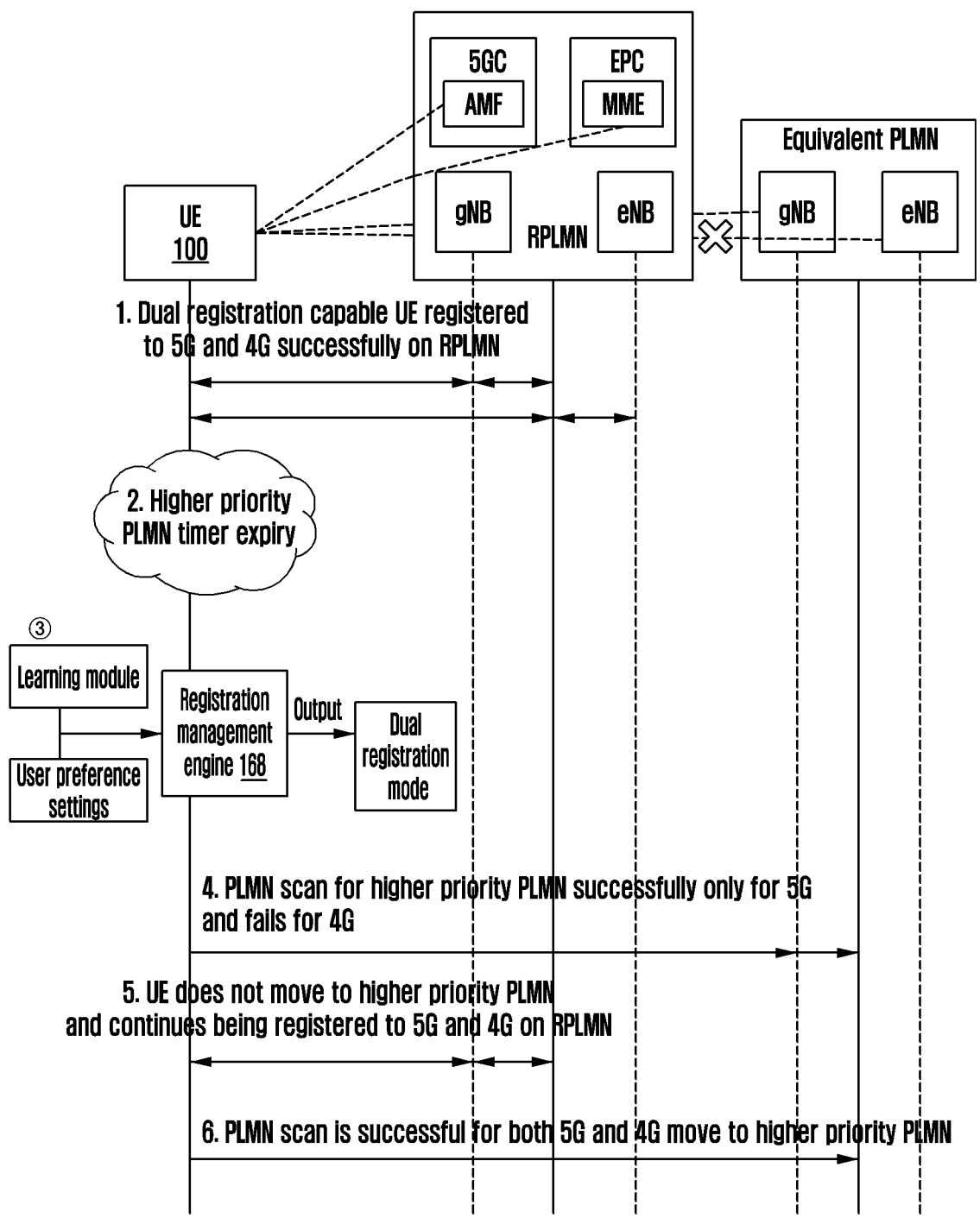
FIG. 4C is a signal diagram illustrating a scenario of the expiry of the higher priority PLMN timer when the preferred mode of operation is the dual registration mode according to an embodiment of the disclosure.

FIG. 4C is a signal diagram illustrating a scenario of the expiry of the higher priority PLMN timer when the preferred mode of operation is the dual registration mode, according to an embodiment of the disclosure.

Referring to FIG. 4C in conjunction with the FIG. 4A, the operations 1 and 2 in the FIG. 4C may be substantially the same as operations 1 and 2 described in the FIG. 4A, and thus repeated description is omitted.

At operation 3, the registration management engine (168) of the UE (100) determines the preferred registration mode as the dual registration mode based on the inputs from the learning engine (170) and the user preference settings. Further, at operation 4, the UE (100) performs the PLMN scan and determines that the PLMN scan for the higher priority PLMN is successful only for the 5G service and fails for the 4G service.

At operation 5, in response to determining that the higher priority PLMN for providing both the 5G services and the 4G services in the dual registration mode is not available, the UE (100) continues to operate with the RPLMN which provides both the 5G services and the 4G services in the dual-registration mode.

At operation 6, in response to determining that the at least one higher priority PLMN which provides the 5G services and the 4G services in the dual registration mode is available, the UE (100) registers to the higher priority PLMN which provides both the 5G services and the 4G services in the dual-registration mode.

Figure 4D:
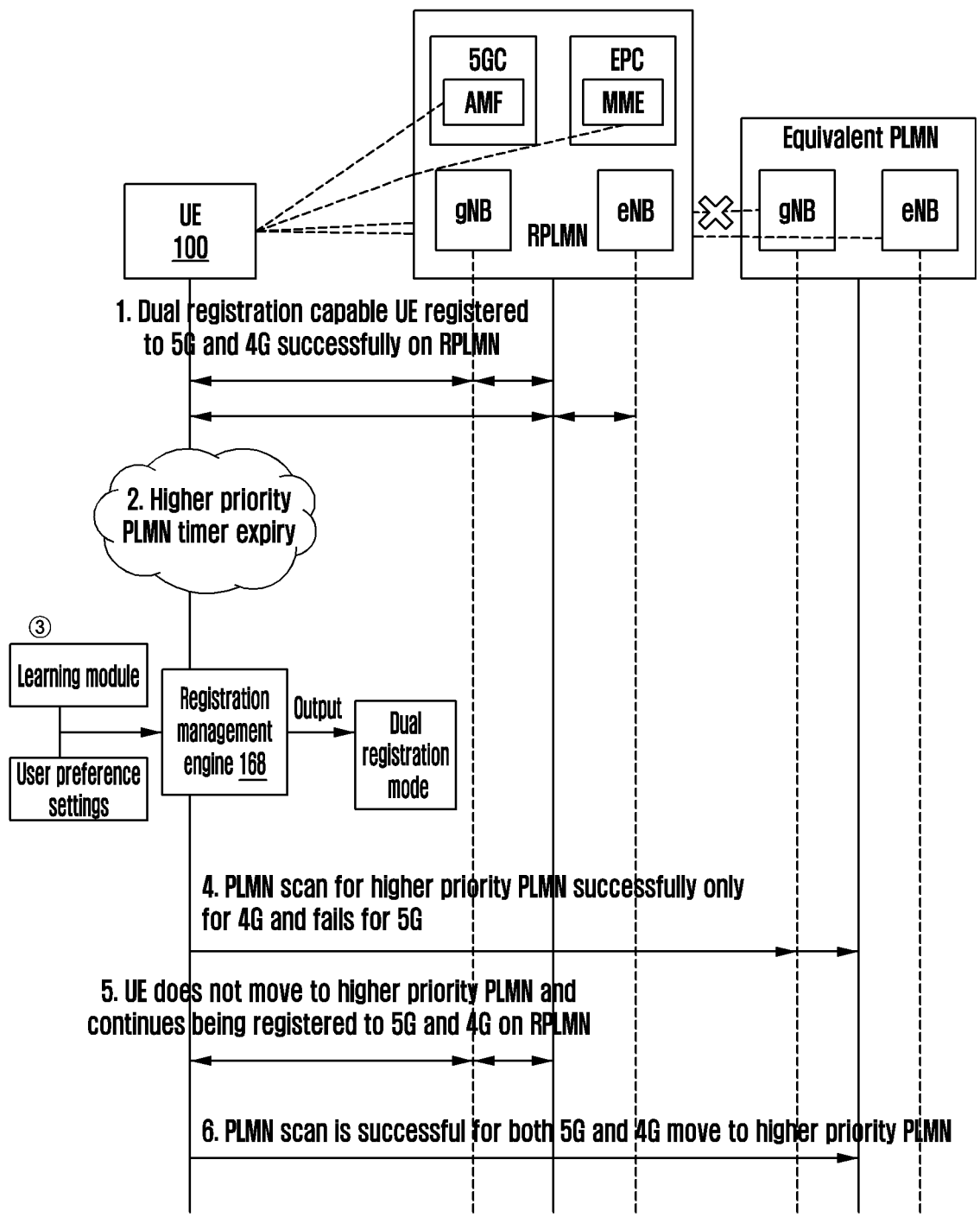
FIG. 4D is a signal diagram illustrating a scenario of the expiry of the higher priority PLMN timer when the preferred mode of operation is the dual registration mode according to an embodiment of the disclosure.

FIG. 4D is a signal diagram illustrating a scenario of the expiry of the higher priority PLMN timer when the preferred mode of operation is the dual registration mode, according to an embodiment of the disclosure.

Referring to FIG. 4D in conjunction with the FIG. 4C, the operations 1 to operation 3 in the FIG. 4D may be substantially the same as operations 1 to operation 3 described in the FIG. 4C, and thus repeated description is omitted. At operation 4, the UE (100) performs the PLMN scan and determines that the PLMN scan for the higher priority PLMN is successful only for the 4G service and fails for the 5G service. At operation 5, in response to determining that the higher priority PLMN for providing both the 5G services and the 4G services in the dual registration mode is not available, the UE (100) continues to operate with the RPLMN which provides both the 5G services and the 4G services in the dual-registration mode.

At operation 6, in response to determining that the at least one higher priority PLMN which provides the 5G services and the 4G services in the dual registration mode is available, the UE (100) registers to the higher priority PLMN which provides both the 5G services and the 4G services in the dual-registration mode.

Figure 4E:
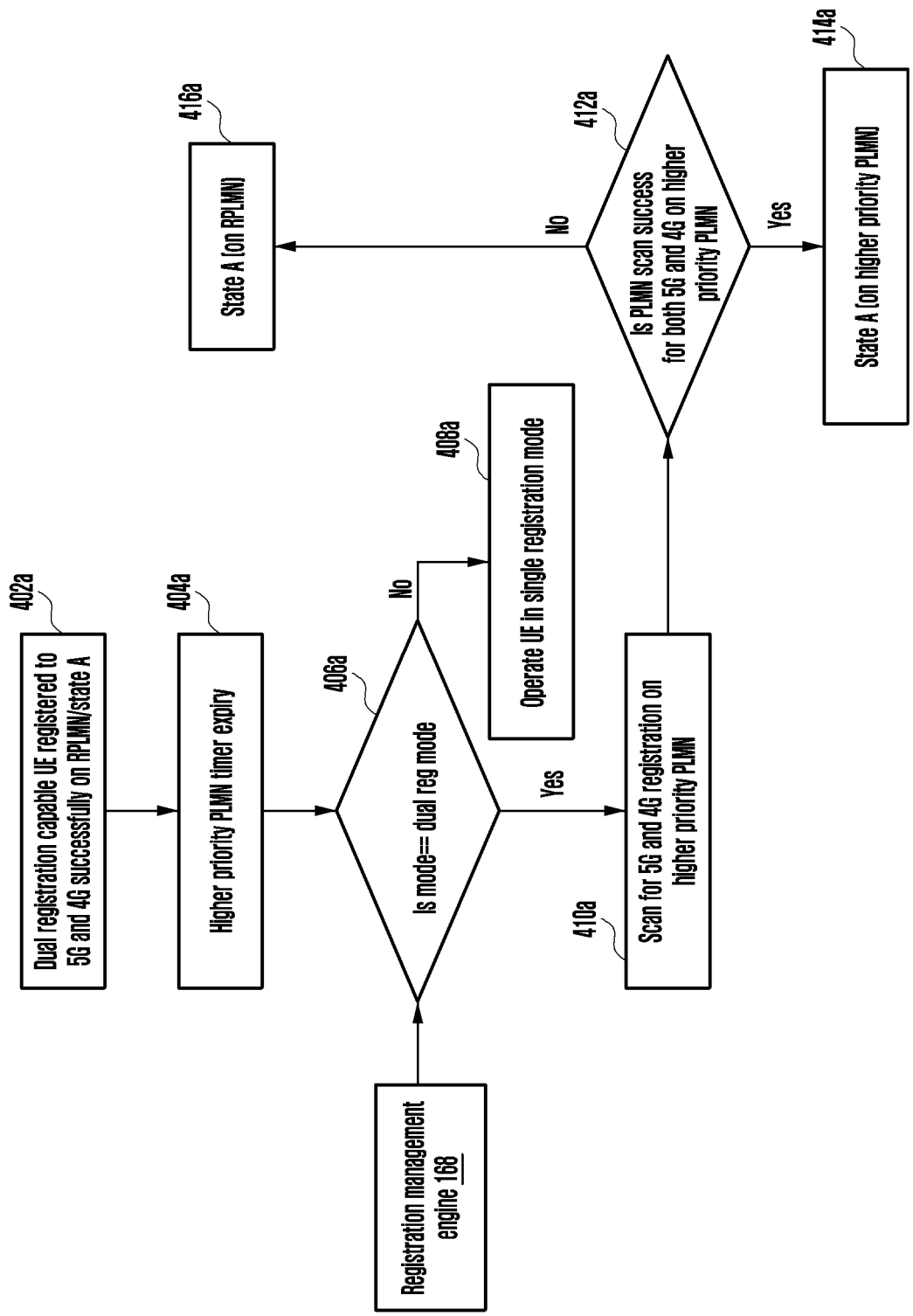
FIG. 4E is a flow chart illustrating the method for performing the PLMN selection by the UE (100) in the dual registration mode on expiry of the higher priority PLMN timer according to an embodiment of the disclosure.

FIG. 4E is a flow chart illustrating the method for performing the PLMN selection by the UE (100) in the dual registration mode on expiry of the higher priority PLMN timer, according to an embodiment of the disclosure.

Referring to FIG. 4E, at operation 402a, the UE (100) registers to the RPLMN for receiving the 5G services and the 4G services in the dual-registration mode.

At operation 404a, the UE (100) determines that the higher priority PLMN timer associated with the HPLMN of the UE (100) is expired. Further, at operation 406a, the UE (100) determines whether the preferred registration mode is the dual registration mode based on the set of parameters received from the registration management engine (168).

At operation 408a, the UE (100), in response to determining that the preferred registration mode is not the dual registration mode, operates in the single registration mode. At operation 410a, in response to determining that the preferred registration mode is the dual registration mode, the UE (100) performs the PLMN scan for the 5G and the 4G registration on the higher priority PLMN.

At operation 412a, the UE (100) determines whether at least one higher priority PLMN is available which provides the 5G services and the 4G services in the dual registration mode based on the PLMN scan.

At operation 414a, in response to determining that the at least one higher priority PLMN is available which provides the 5G services and the 4G services in the dual registration mode based on the PLMN scan, the UE (100) registers to the higher priority PLMN (state A).

At operation 416a, in response to determining that the at least one higher priority PLMN is not available which provides the 5G services and the 4G services in the dual registration mode based on the PLMN scan, the UE (100) continues to operate with the RPLMN which provides the 5G services and the 4G services in the dual-registration mode.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope.

Figure 4F:
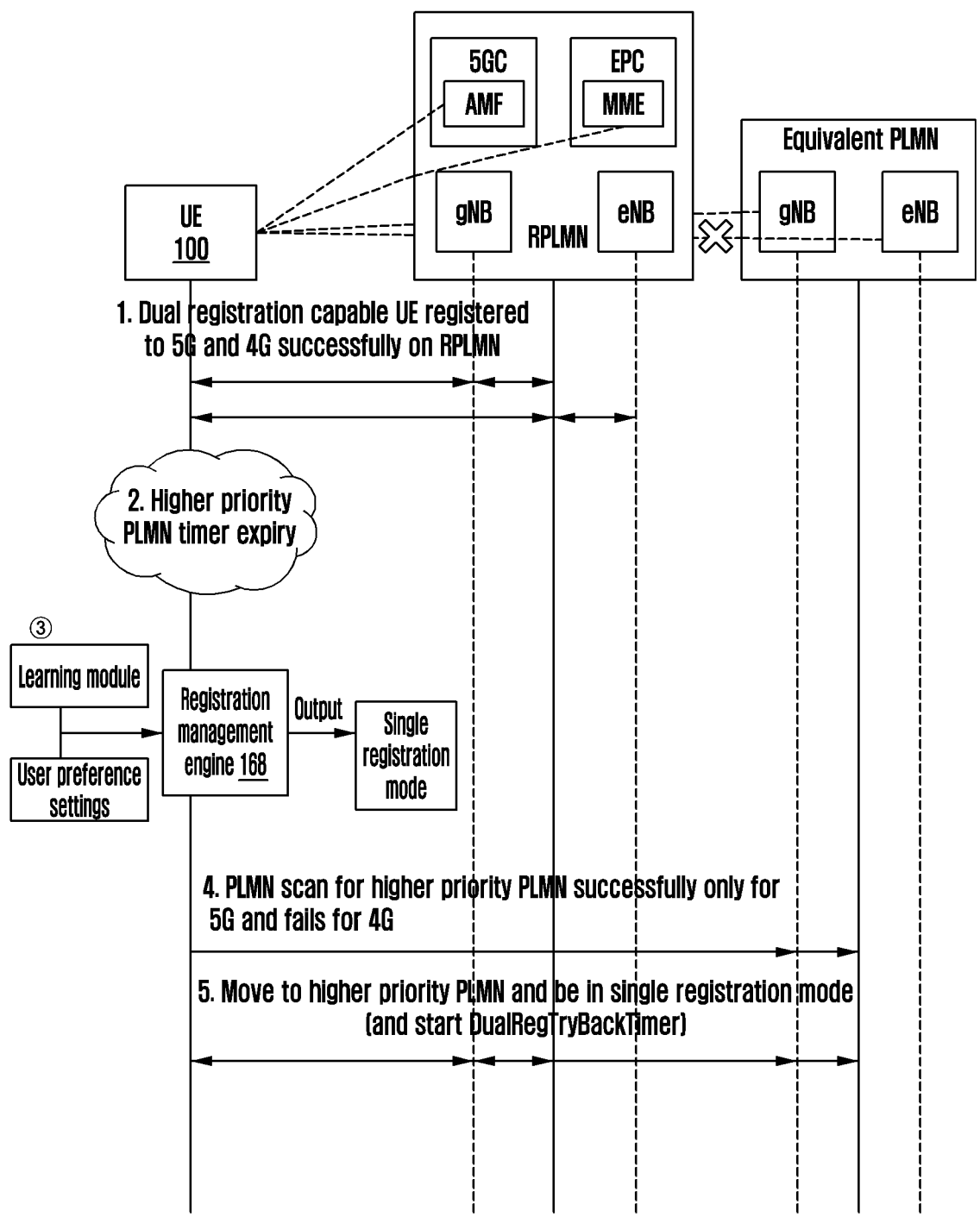
FIG. 4F is a signal diagram illustrating a scenario of the expiry of the higher priority PLMN timer when the preferred mode of operation is a single registration mode according to an embodiment of the disclosure.

FIG. 4F is a signal diagram illustrating a scenario of the expiry of the higher priority PLMN timer when the preferred mode of operation is a single registration mode, according to an embodiment of the disclosure.

Referring to FIG. 4F in conjunction with the FIG. 4C, the operations 1 and 2 in the FIG. 4F may be substantially the same as operations 1 and 2 described in the FIG. 4C, and thus repeated description is omitted.

At operation 3, the registration management engine (168) of the UE (100) determines the preferred registration mode as the single registration mode based on the inputs from the learning engine (170) and the user preference settings. Further, at operation 4, the UE (100) performs the PLMN scan and determines that the PLMN scan for the higher priority PLMN is successful only for the 5G service and fails for the 4G service.

At operation 5, the UE (100) registers to the higher priority PLMN which provides only the 5G service in the single registration mode and simultaneously activates the timer (example, the DualRegTryBackTime). Further, the UE (100) waits for the activated timer to expire so that the UE (100) can perform the PLMN scan to switch to the dual registration mode from the single registration mode.

Figure 4G:
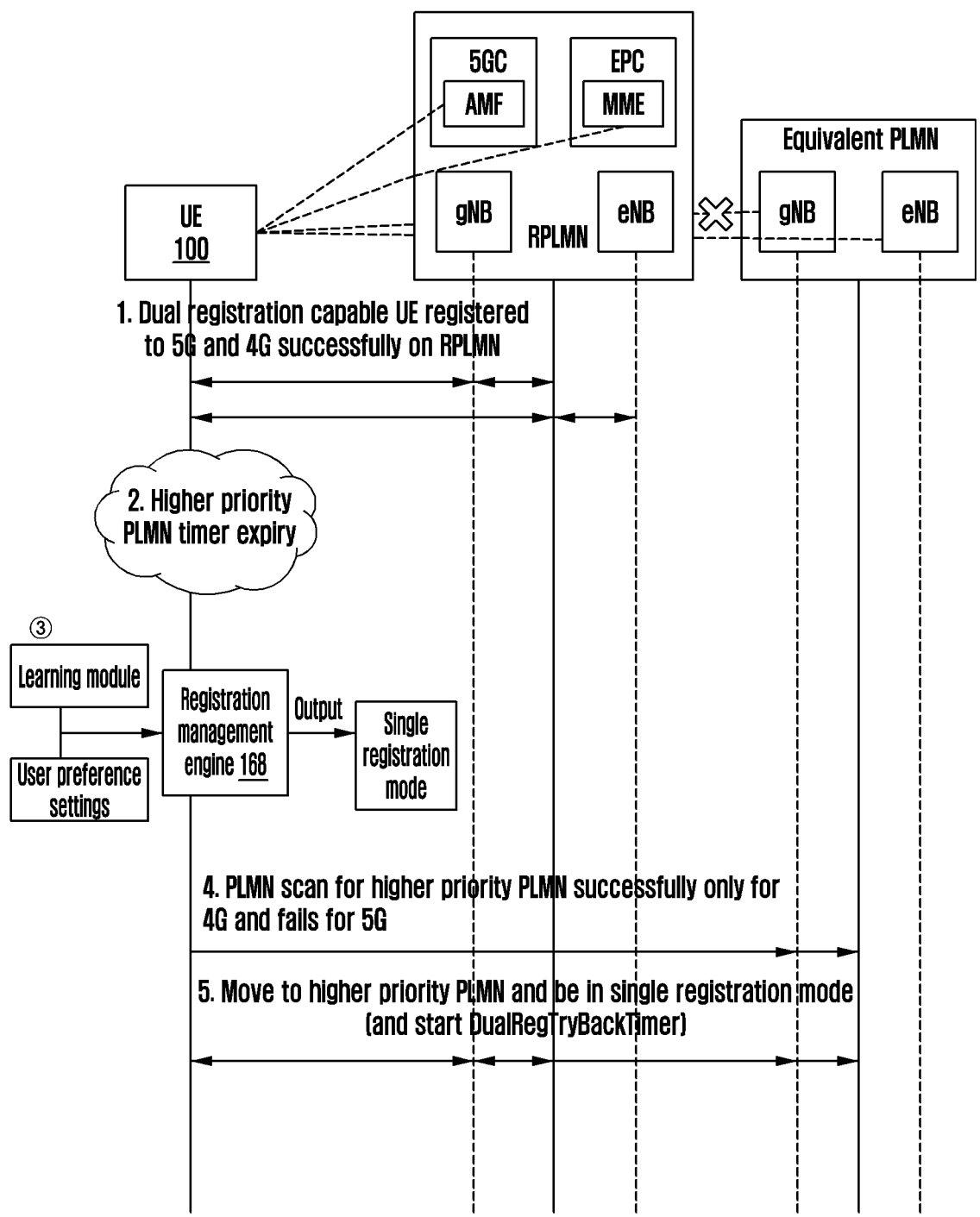
FIG. 4G is a signal diagram illustrating a scenario of the expiry of the higher priority PLMN timer when the preferred mode of operation is a single registration mode according to embodiment of the disclosure.

FIG. 4G is a signal diagram illustrating a scenario of the expiry of the higher priority PLMN timer when the preferred mode of operation is a single registration mode, according to an embodiment of the disclosure.

Referring to FIG. 4G in conjunction with the FIG. 4F, the operations 1 to operation 3 in the FIG. 4G may be substantially the same as operations 1 to operation 3 described in the FIG. 4F, and thus repeated description is omitted. At operation 4, the UE (100) performs the PLMN scan and determines that the PLMN scan for the higher priority PLMN is successful only for the 4G service and fails for the 5G service.

At operation 5, the UE (100) registers to the higher priority PLMN which provides only the 4G service in the single registration mode and simultaneously activates the timer (example, the DualRegTryBackTimer). Further, the UE (100) waits for the activated timer to expire so that the UE (100) can perform the PLMN scan to switch to the dual registration mode from the single registration mode. The UE (100) shall perform the higher priority PLMN SCAN when the UE (100) in both the RAT's 4G and 5G moves to IDLE mode.

Figure 4H:
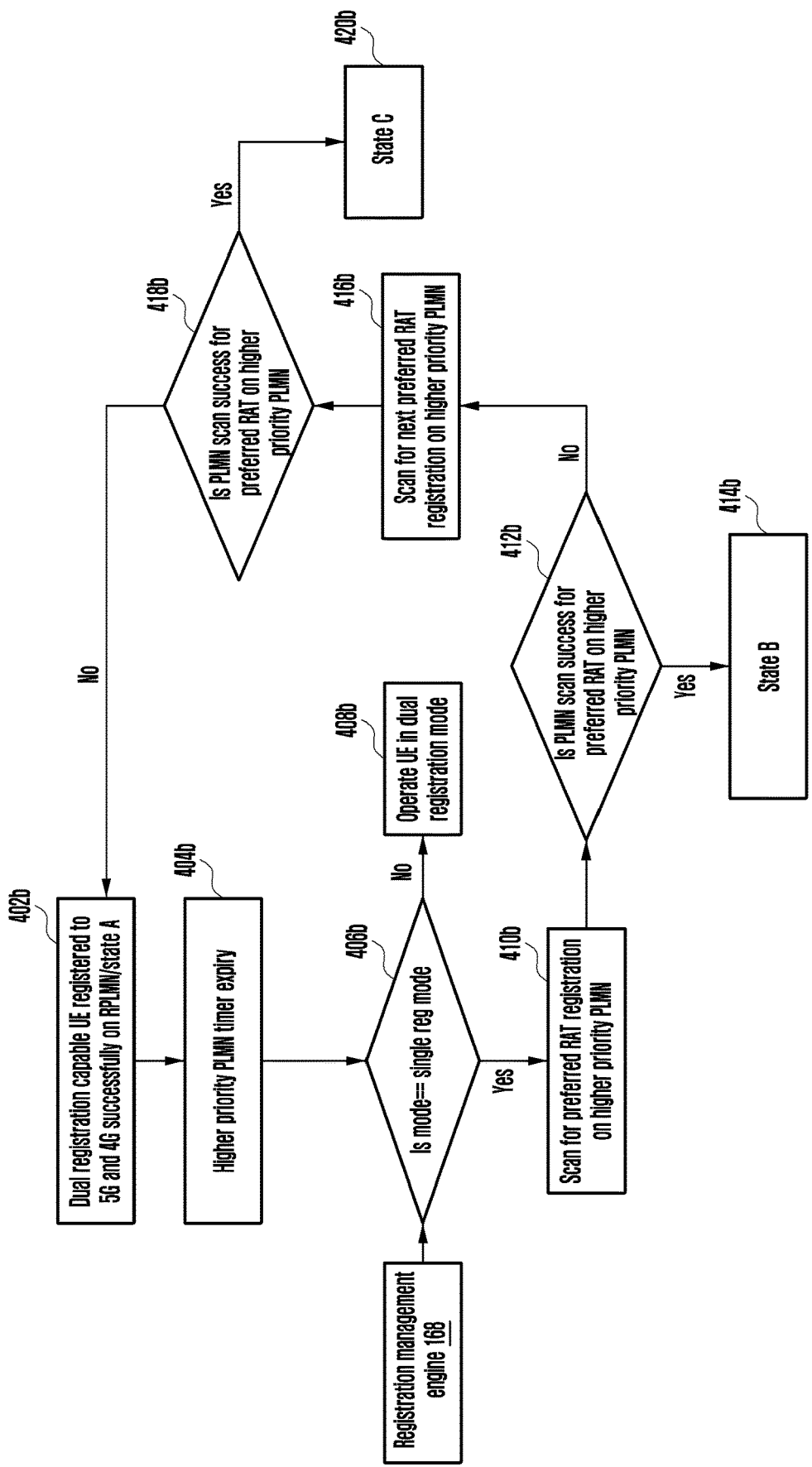
FIG. 4H is a flow chart illustrating the method for performing the PLMN selection by the UE (100) in the single registration mode on the expiry of the higher priority PLMN timer according to an embodiment of the disclosure.

FIG. 4H is a flow chart illustrating the method for performing the PLMN selection by the UE (100) in the single registration mode on the expiry of the higher priority PLMN timer, according to an embodiment of the disclosure.

Referring to the FIG. 4H, at operation 402b, the UE (100) registers to the RPLMN for receiving the 5G services and the 4G services in the dual-registration mode. At operation 404b, the UE (100) determines that the higher priority PLMN timer associated with the HPLMN of the UE (100) is expired. Further, at operation 406b, the UE (100) determines whether the preferred registration mode is the single registration mode based on the set of parameters received from the registration management engine (168).

At operation 408b, the UE (100), in response to determining that the preferred registration mode is not the single registration mode, operates in the dual registration mode (as described in FIG. 4E).

At operation 410b, in response to determining that the preferred registration mode is the single registration mode, the UE (100) performs the PLMN scan for the preferred RAT registration on the higher priority PLMN. At operation 412b, the UE (100) determines whether the PLMN scan for the preferred RAT registration on the higher priority PLMN is successful.

At operation 414b, in response to determining that the PLMN scan for the preferred RAT registration on the higher priority PLMN is successful, the UE (100) registers to the higher priority PLMN (state B). At operation 416b, in response to determining that PLMN scan for the preferred RAT registration on the higher priority PLMN is not successful, the UE (100) performs the PLMN scan for the next preferred RAT registration on the higher priority PLMN.

At operation 418b, the UE (100) determines whether the PLMN scan for the next preferred RAT registration on the higher priority PLMN is successful. Further, at operation 420b, in response to determining that PLMN scan for the next preferred RAT registration on the higher priority PLMN is successful, the UE (100) registers to the higher priority PLMN with the next preferred RAT (state C). At operation 418b, in response to determining that PLMN scan for the next preferred RAT registration on the higher priority PLMN is successful, the UE (100) continues to operate with the RPLMN which provides the 5G services and the 4G services in the dual-registration mode.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope.

Figure 5A:
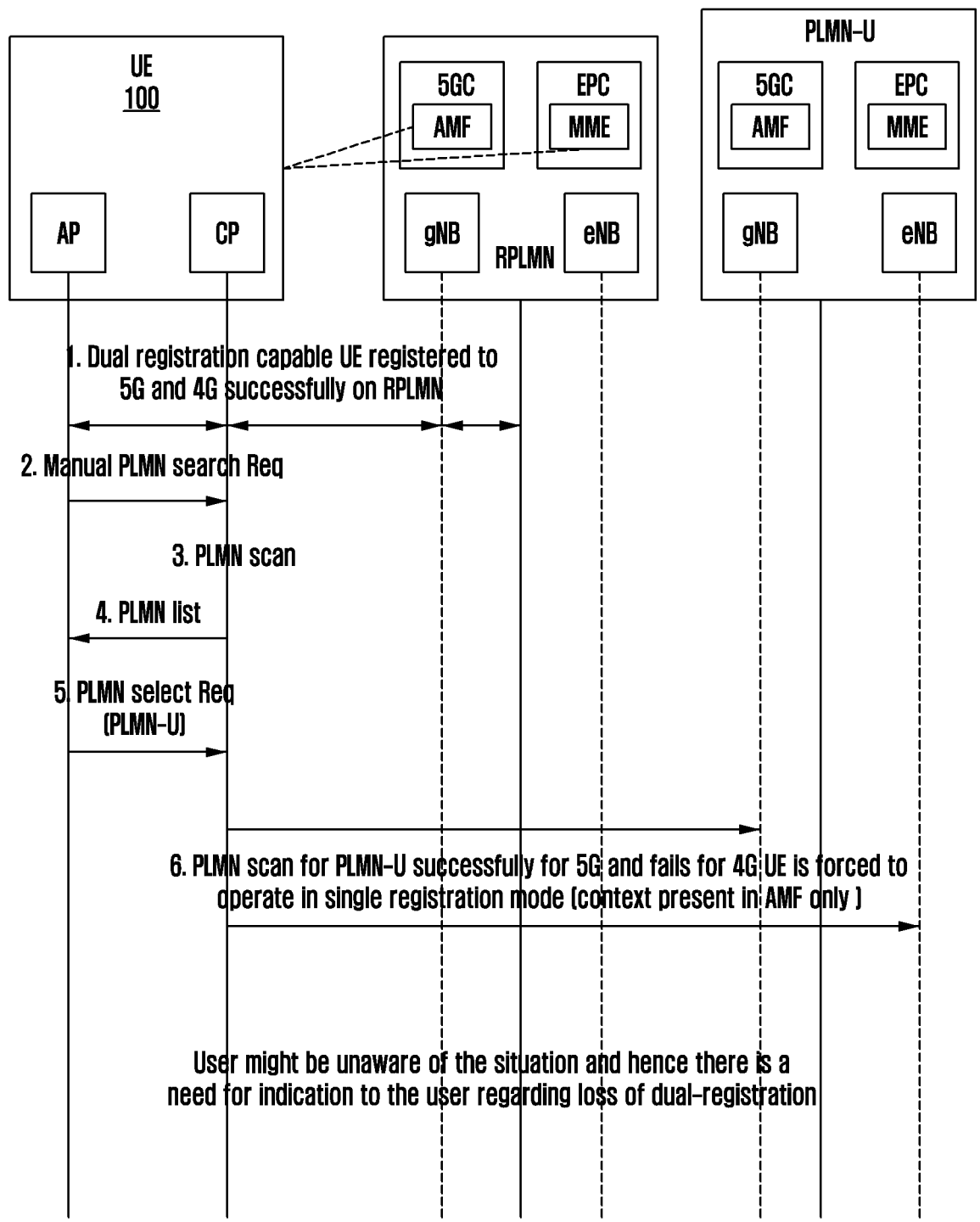
FIG. 5A is a signal diagram illustrating a manual PLMN selection by a user when the UE (100) is in the dual registration mode according to an embodiment of the disclosure.

FIG. 5A is a signal diagram illustrating a manual PLMN selection by a user when the UE (100) is in the dual registration mode, according to an embodiment of the disclosure.

Referring to FIG. 5A, consider that the UE (100) is dual registration capable and is registered with the RPLMN for the 5G services and the 4G services, as shown in operation 1.

At operation 2, the UE (100) receives a manual PLMN search request and at operation 3, the UE (100) performs the PLMN scan and retrieves the list of PLMNs available. At operation 4, the UE (100) provides the list of PLMNs available to the user by displaying the list on the screen of the UE (100). Further, at operation 5, the UE (100) receives the PLMN select request from the user indicating that the PLMN-U is selected by the user from the list of PLMNs available.

At operation 6, the UE (100) determines that the PLMN scan for the PLMN-U is successful for the 5G services and fails for the 4G services. Therefore, the UE (100) is forced to operate in the single registration mode (context in access and mobility management function (AMF) only) even though the UE (100) is dual registration capable.

Figure 5B:
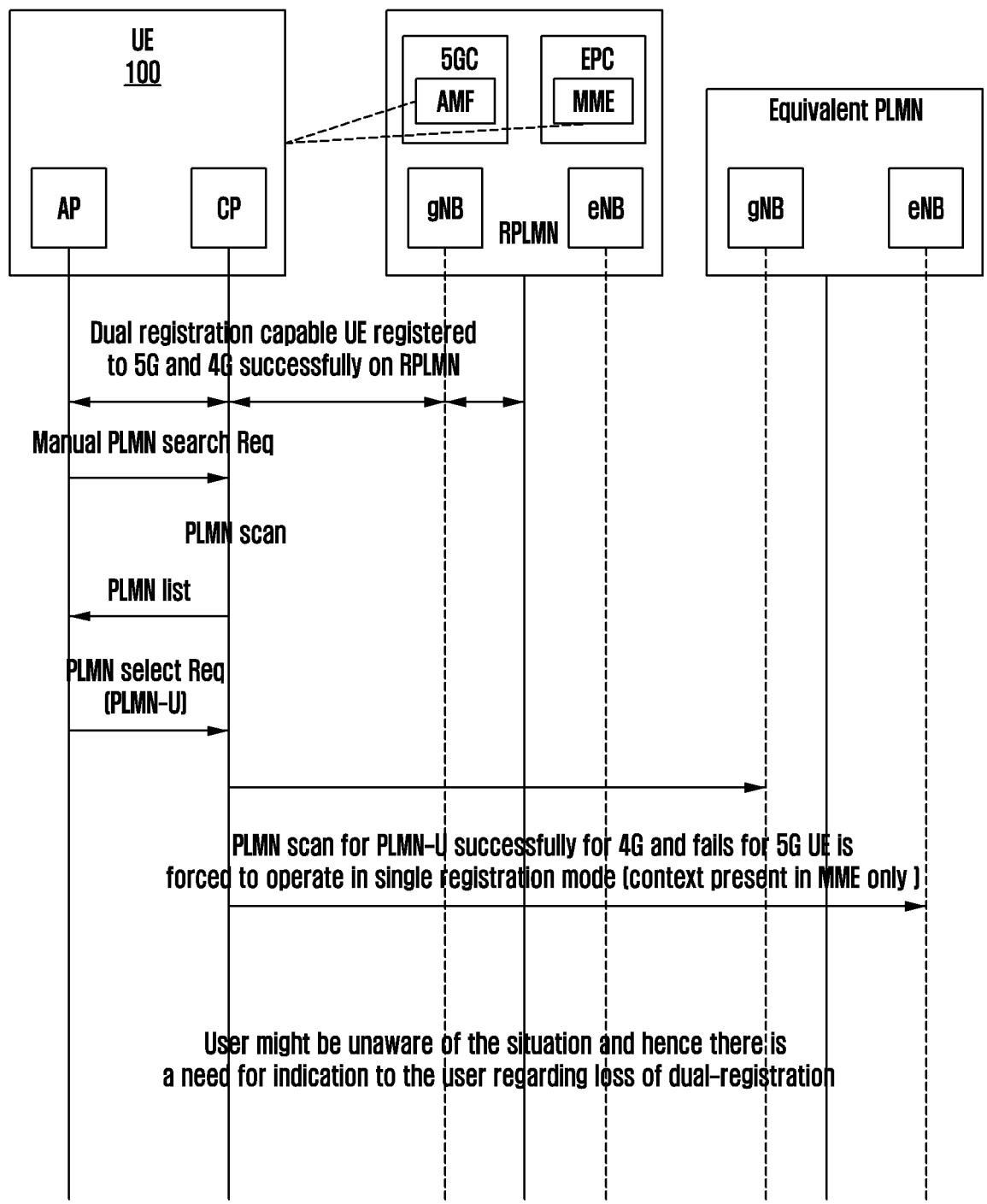
FIG. 5B is a signal diagram illustrating a manual PLMN selection by a user when the UE (100) is in the dual registration mode according to an embodiment of the disclosure.

FIG. 5B is a signal diagram illustrating a manual PLMN selection by a user when the UE (100) is in the dual registration mode, according an embodiment of the disclosure.

Referring to FIG. 5B, the operations 1 to 5 are substantially same and hence repeated description is omitted. At operation 6, the UE (100) determines that the PLMN scan for the PLMN-U is successful for the 4G services and fails for the 5G services. Therefore, the UE (100) is forced to maintain the single registration context (only in the mobility management entity (MME)), even though the UE (100) is dual registration capable.

Therefore, in the methods and systems, when the PLMN list is indicated to the user during the manual PLMN selection procedure, and the user chooses a particular PLMN there is a possibility that the user-chosen PLMN service is available for either the N1 mode or the S1 mode thereby forcing the UE (100) to maintain the context only in one of the AMF and the MME.

Figure 5C:
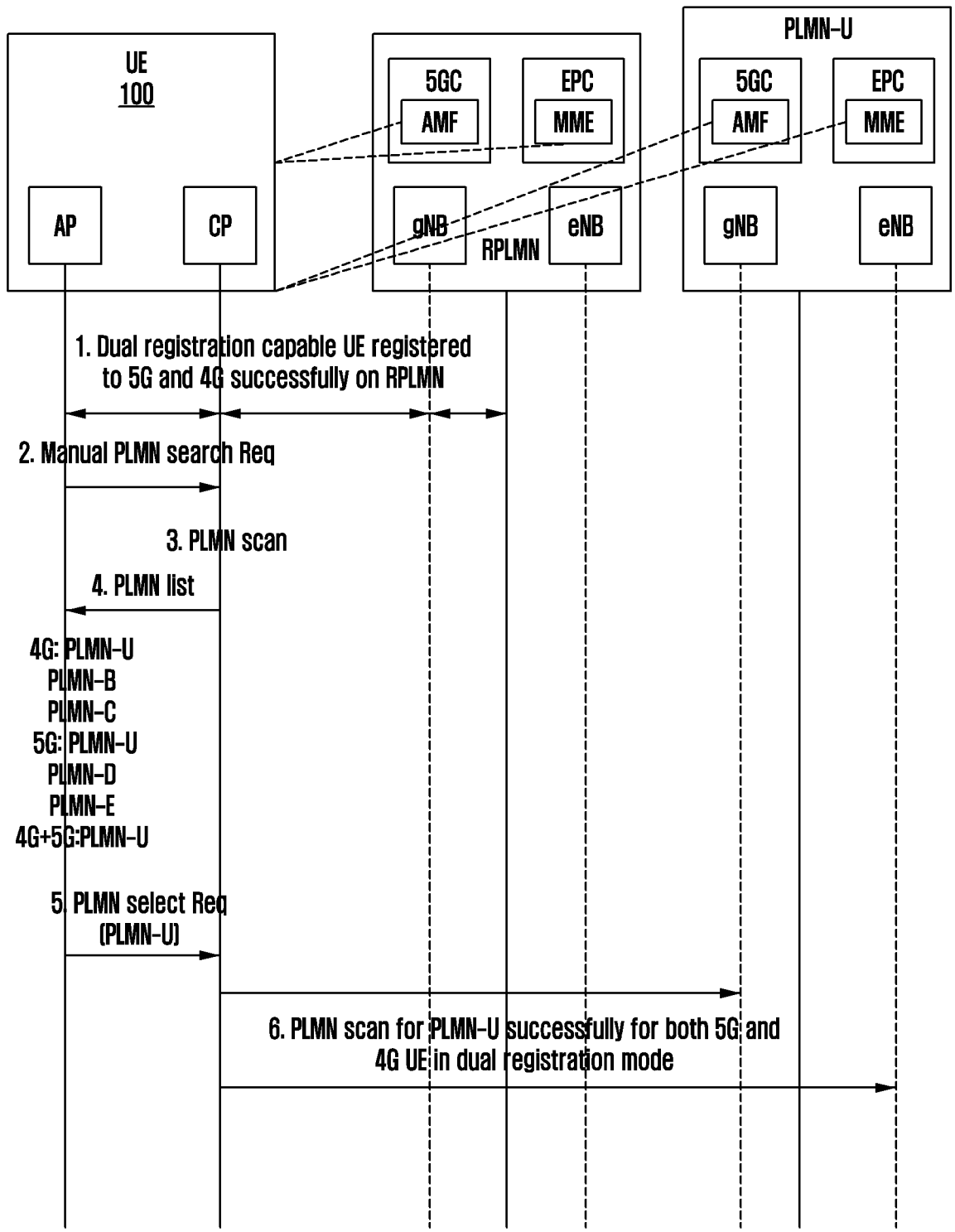
FIG. 5C is a signal diagram illustrating the manual PLMN selection by the user when the UE (100) is in the dual registration mode according to an embodiment of the disclosure.

FIG. 5C is a signal diagram illustrating the manual PLMN selection by the user when the UE (100) is in the dual registration mode, according to an embodiment of the disclosure.

Figure 5D:
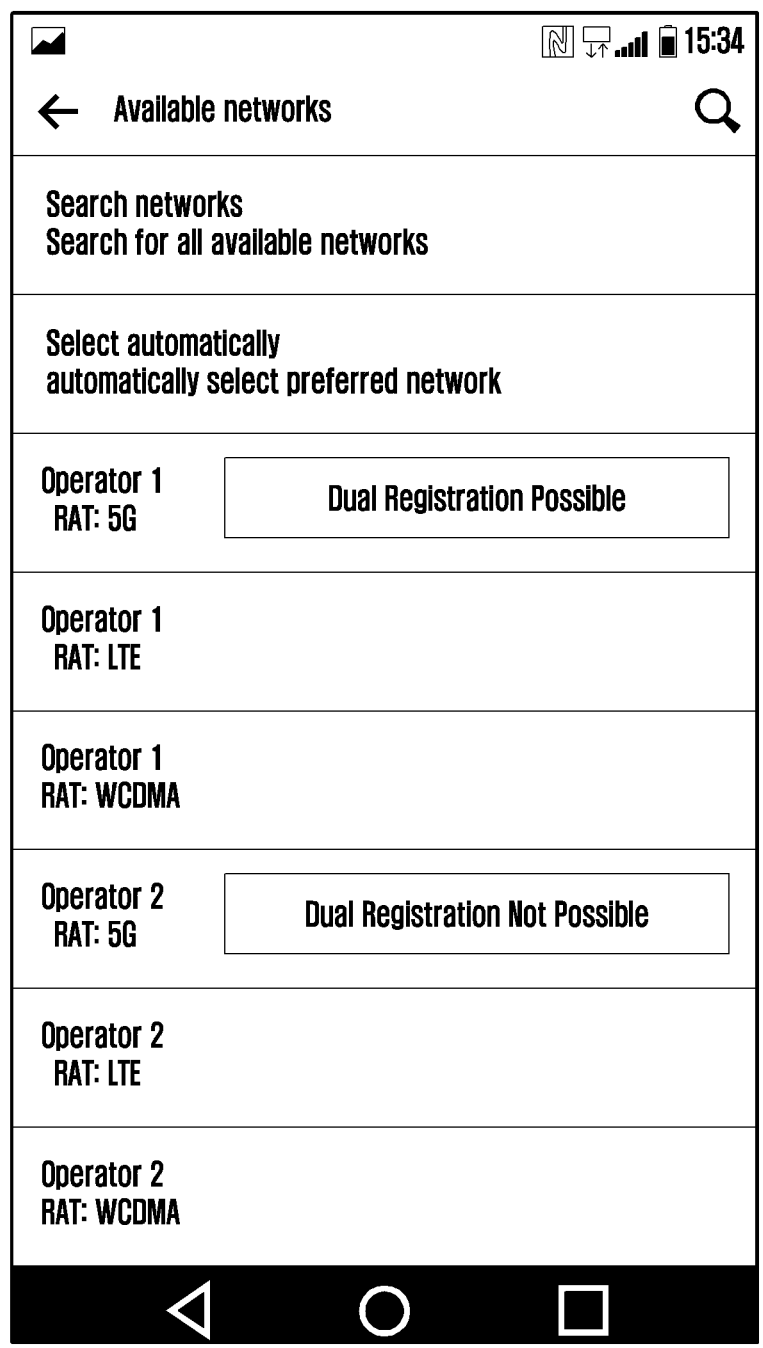
FIG. 5D illustrates a user interface of the UE (100) which provides a list of PLMNs based on a PLMN scan according to an embodiment of the disclosure.

FIG. 5D illustrates a user interface of the UE (100) which provides a list of PLMNs based on a PLMN scan, according to an embodiment of the disclosure.

Referring to FIG. 5C in conjunction with the FIG. 5A and the FIG. 5B, the operations 1 to 3 are substantially same and hence repeated description is omitted. However, in the proposed method, at operation 4, the UE (100) while displaying the list of PLMNs based on the PLMN scan indicates the availability of the dual-registration mode for each of the PLMN in the list of PLMNs (as shown in FIG. 5D). Therefore, the user is able to select the PLMN which supports the dual-registration mode from the list of PLMNs, thereby avoiding using the dual-registration capable UE (100) for maintaining the context in only one of the AMF and the MME. Further, at operation 5, the UE (100) receives the input indicating the selection of the PLMN-U from the list of PLMNs displayed.

At operation 6, the UE (100) performs the PLMN scan for the PLMN-U successfully for both the 5G services and the 4G services. Thus operating the UE (100) in the dual registration mode.

Figure 5E:
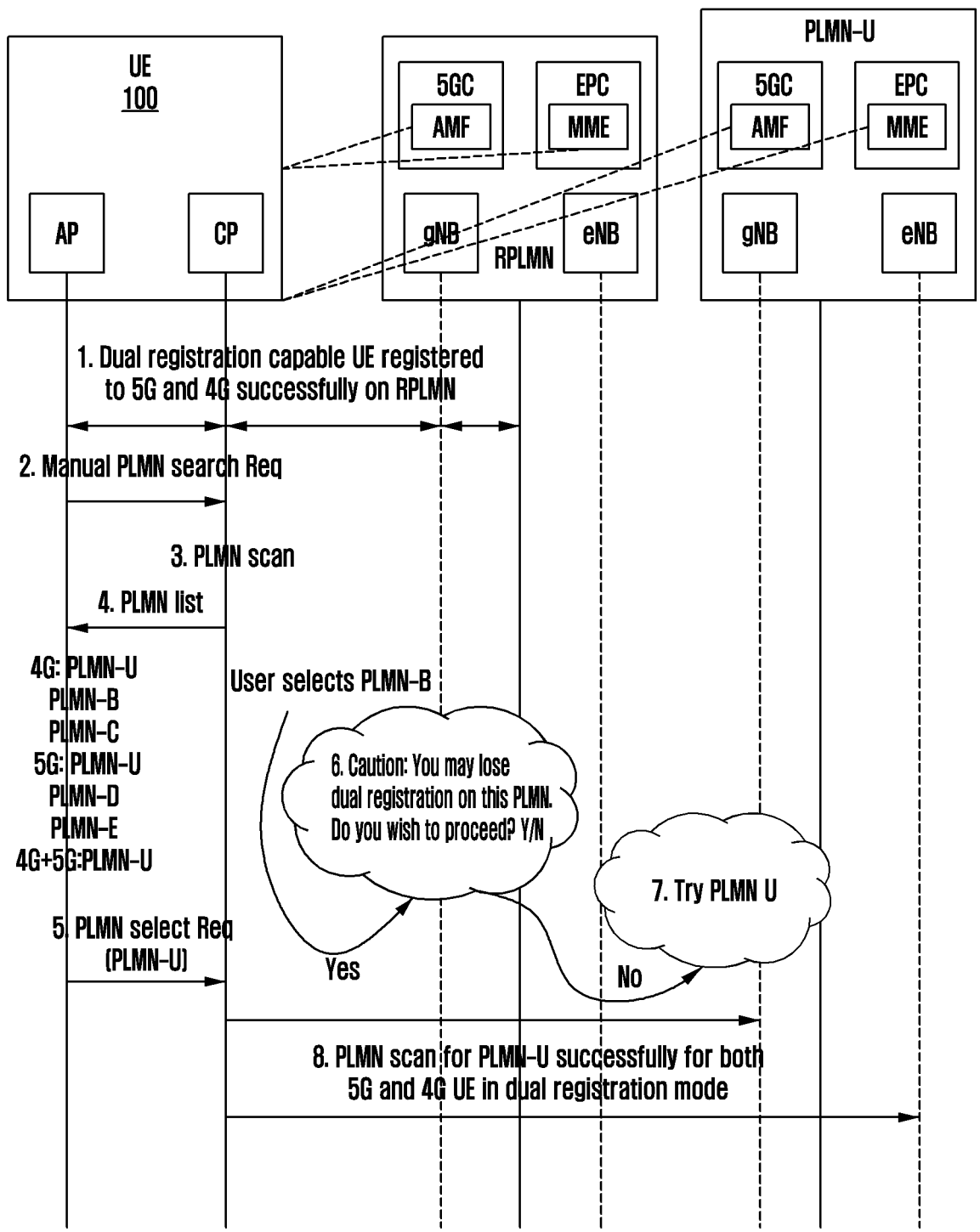
FIG. 5E is a signal diagram illustrating the manual PLMN selection by the user when the UE (100) is in the dual registration mode along with providing a warning message on the selection of the PLMN according to an embodiment of the disclosure.

FIG. 5E is a signal diagram illustrating the manual PLMN selection by the user when the UE (100) is in the dual registration mode along with providing a warning message on the selection of the PLMN, according to an embodiment of the disclosure.

Referring to FIG. 5E in conjunction with the FIG. 5C, the operations 1 to 5 are substantially same and hence repeated description is omitted. In the proposed method, when the user selects the PLMN-B which may not support the dual registration mode, at operation 6, the UE (100) determines that the PLMN-B does not support the dual registration mode and provides a warning message indicating that the dual registration provided by the RPLMN is not available in the selected PLMN. Further, at operation 7, the UE (100) also suggests at least one PLMN (i.e., PLMN-U) from the list of PLMNs which supports the dual registration mode. Furthermore, the user may select the PLMN-U suggested by the UE (100) and in response to the selection of the PLMN-U by the user, the UE (100) performs the PLMN scan for the PLMN-U which is successfully for both the 5G services and the 4G services. Therefore, the UE (100) operates in the dual registration mode.

The embodiments disclosed herein can be implemented through at least one software program running on at least one hardware device and performing network management functions to control the elements. The elements shown in the FIGS. 1 to 5E include blocks, elements, actions, acts, operations, or the like which can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing public land mobile network (PLMN) selection by a user equipment (UE) in a dual registration mode, the method comprising:
   registering, by the UE, on a registered PLMN (RPLMN) for receiving first wireless technology services, wherein the UE is dual registration capable;
   detecting, by the UE, unavailability of second wireless technology services in at least one of the RPLMN and an equivalent PLMN (EqPLMN);
   starting, by the UE, a periodic timer in response to detecting the unavailability of the second wireless technology services in at least one of the RPLMN and the EqPLMN; and
   performing, by the UE, the PLMN selection based on PLMN scan after an expiry of the periodic timer by performing one of:
      registering to one of the RPLMN and the EqPLMN in the dual registration mode to receive the second wireless technology services, when the second wireless technology services is available in at least one of the RPLMN and the EqPLMN, and
      performing another PLMN scan for the first wireless technology services and the second wireless technology services, when the second wireless technology services is unavailable in at least one of the RPLMN and the EqPLMN.

2. The method of claim 1, further comprising:
   determining, by the UE, a number of PLMN scans performed is greater than a PLMN scan threshold;
   activating, by the UE, a long timer, wherein a duration of the long timer is greater than a duration of the periodic timer; and
   suspending, by the UE, the PLMN scan when the long timer is active,
   wherein the performing of the PLMN selection based on the PLMN scan after the expiry of the periodic timer comprises performing, by the UE, the PLMN scan on each expiry of the periodic timer to determine availability of the second wireless technology services on at least one of the RPLMN and the EqPLMN,
   wherein the performing of the other PLMN scan for the first wireless technology services and the second wireless technology services comprises:
      checking, by the UE, availability of the first wireless technology services and the second wireless technology services on the other PLMN having a lower priority than a priority of the RPLMN or a priority of the EqPLMN,
      performing, by the UE, one of:
         registering to the other PLMN when the other PLMN provides the first wireless technology services and the second wireless technology services in the dual registration mode, and
         continuing to receive only the first wireless technology services over the RPLMN in a single registration mode, when the other PLMN does not provide the first wireless technology services and the second wireless technology services, and
   wherein the periodic timer is one of an incremental timer and a higher priority PLMN timer.

3. The method of claim 1,
   wherein the first wireless technology services is $4^{th}$ generation (4G) services and the second wireless technology services is $5^{th}$ generation (5G) services, or
   wherein the first wireless technology services is 5G services and the second wireless technology services is 4G services.

4. The method of claim 1, wherein the performing of the PLMN selection comprises:
   displaying a list of PLMNs based on the PLMN scan along with an indication of availability of the dual registration mode for at least one of the PLMN in the list of PLMNs, and
   receiving an input indicating a selection of a PLMN from the list of PLMNs displayed.

5. A user equipment (UE) for performing PLMN selection in dual registration mode, the UE comprising:
   a memory; and
   a processor coupled to the memory and configured to:
      register on a registered PLMN (RPLMN) for connecting with first wireless technology services, wherein the UE is dual registration capable,
      detect unavailability of second wireless technology services in at least one of the RPLMN and an equivalent PLMN (EqPLMN),
      start a periodic timer in response to detecting the unavailability of the second wireless technology services, and
      perform the PLMN selection based on a PLMN scan after an expiry of the periodic timer by performing one of:
         registering to one of the RPLMN and the EqPLMN in the dual registration mode to receive the second wireless technology services, when the second wireless technology services is available in at least one of the RPLMN and the EqPLMN, and performing another PLMN scan for the first wireless technology services and the second wireless technology services, when the second wireless technology services is unavailable in at least one of the RPLMN and the EqPLMN.

6. The UE of claim 5, wherein the processor is further configured to:
determine a number of PLMN scans performed is greater than a PLMN scan threshold,
activate a long timer, wherein a duration of the long timer is greater than a duration of the periodic timer, and
suspend the PLMN scan when the long timer is active, wherein the processor is configured to perform the PLMN selection based on the PLMN scan after the expiry of the periodic timer by:
performing the PLMN scan on each expiry of the periodic timer to determine a availability of the second wireless technology services on at on at least one of the RPLMN and the EqPLMN, wherein the processor is configured to perform the other PLMN scan for the first wireless technology services and the second wireless technology services by:

checking availability of the first wireless technology services and the second wireless technology services on the other PLMN having a lower priority than a priority of the RPLMN or a priority of the EqPLMN, and performing one of:
register to the other PLMN when the lower priority PLMN provides the first wireless technology services and the second wireless technology services in the dual registration mode, and
continue to receive only the first wireless technology services over the RPLMN in a single registration mode, when the other PLMN does not provide the first wireless technology services and the second wireless technology services, and wherein the periodic timer is one of an incremental timer and a higher priority PLMN timer.

7. The UE of claim 5, wherein the first wireless technology services is 4G services and the second wireless technology services is 5G services, or wherein the first wireless technology services is 5G services and the second wireless technology services is 4G services.

* * * * *